(12) United States Patent
Kuribayashi

(10) Patent No.: US 12,332,578 B2
(45) Date of Patent: Jun. 17, 2025

(54) OPTICAL SCANNING DEVICE

(71) Applicant: TOSHIBA TEC KABUSHIKI KAISHA, Tokyo (JP)

(72) Inventor: Yasushi Kuribayashi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 630 days.

(21) Appl. No.: 17/704,138

(22) Filed: Mar. 25, 2022

(65) Prior Publication Data

US 2023/0305425 A1    Sep. 28, 2023

(51) Int. Cl.
| G02B 26/08 | (2006.01) |
| G02B 26/12 | (2006.01) |
| G03G 15/043 | (2006.01) |
| H04N 1/053 | (2006.01) |

(52) U.S. Cl.
CPC ....... *G03G 15/043* (2013.01); *G02B 26/0816* (2013.01); *G02B 26/12* (2013.01); *G02B 26/123* (2013.01); *G02B 26/124* (2013.01); *H04N 1/053* (2013.01)

(58) Field of Classification Search
CPC .............. G03G 15/043; G03G 15/0409; G02B 26/0816; G02B 26/12; G02B 26/123; G02B 26/124; H04N 1/053
See application file for complete search history.

(56) References Cited

U.S. PATENT DOCUMENTS

| 7,355,765 B2 * | 4/2008 | Yoshida | H04N 1/053 347/225 |
| 2006/0245009 A1 | 11/2006 | Akiyama et al. | |
| 2007/0236557 A1 * | 10/2007 | Imai | G02B 26/123 359/197.1 |
| 2009/0058979 A1 | 3/2009 | Saisho et al. | |
| 2009/0323147 A1 * | 12/2009 | Amada | G03G 15/326 359/205.1 |
| 2009/0324293 A1 * | 12/2009 | Tomioka | G02B 26/127 399/221 |

FOREIGN PATENT DOCUMENTS

| JP | 2005-062714 | 3/2005 |
| JP | 2007-072156 | 3/2007 |

\* cited by examiner

*Primary Examiner* — Euncha P Cherry
(74) *Attorney, Agent, or Firm* — Amin, Turocy & Watson, LLP

(57) ABSTRACT

An optical scanning device deflects light for scanning in a main scanning direction and includes a plurality of light sources, a plurality of photodetectors, a plurality of optical element groups, and a polygon mirror. The plurality of light sources emit laser lights. The plurality of photodetectors detect beams formed by the laser lights. The plurality of optical element groups guide the beams to the photodetectors. The polygon mirror deflects the beams for scanning in one direction of the main scanning direction from one end to the other end on the opposite side of the one end. The plurality of optical element groups cross a crossing axis parallel to the main scanning direction, cross a rotation axis of the polygon mirror, and are rotationally symmetrical with respect to an axis of symmetry parallel to the rotation axis of the polygon mirror.

13 Claims, 11 Drawing Sheets

OPTICAL SCANNING DEVICE

FIELD

Embodiments described herein relate generally to an optical scanning device, an image forming apparatus, and methods related thereto.

BACKGROUND

An electrophotographic image forming apparatus deflects a light beam (a beam) for scanning to form an electrostatic latent image on a photoconductive body. The image forming apparatus includes an optical scanning device that deflects a plurality of beams for scanning. The optical scanning device includes, for example, photodetectors that detect a plurality of beams. The optical scanning device adjusts synchronization of the beams based on detection results in the photodetectors of the beam at an image writing start and the beam at an image writing end.

DETAILED DESCRIPTION

According to an embodiment, an optical scanning device is provided in an image forming apparatus and deflects light for scanning in a main scanning direction along a rotation axis of a photoconductive body. The optical scanning device includes a plurality of light sources, a plurality of photodetectors, a plurality of optical element groups, and a polygon mirror. The plurality of light sources emit laser lights. The plurality of photodetectors detect beams formed by the laser lights. The plurality of optical element groups guide the beams to the photodetectors. The polygon mirror deflects the beams for scanning in one direction of the main scanning direction from one end to the other end on the opposite side of the one end. The plurality of optical element groups cross a crossing axis parallel to the main scanning direction and crossing a rotation axis of the polygon mirror and are rotationally symmetrical with respect to an axis of symmetry parallel to the rotation axis of the polygon mirror.

First Embodiment

An image forming apparatus 1 according to a first embodiment is explained with reference to FIGS. 1 to 10.

Figure 1:
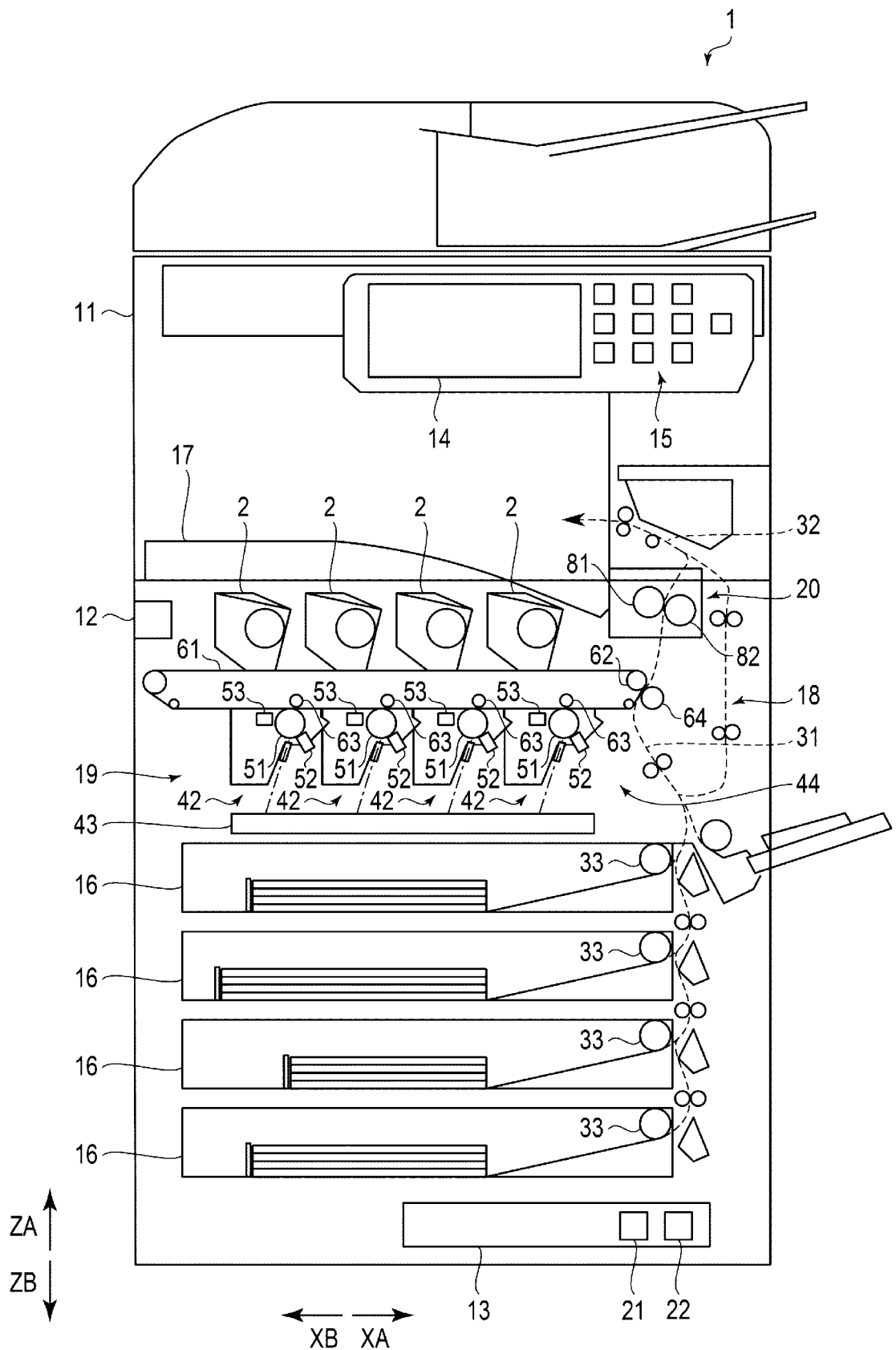
FIG. 1 is a schematic diagram illustrating an image forming apparatus including an optical scanning device according to first and second embodiments.

FIG. 1 is a schematic diagram illustrating an image forming apparatus including an optical scanning device according to the first embodiment. The image forming apparatus 1 is, for example, a multifunction printer (MFP) that performs various kinds of processing such as image formation while conveying a recording medium. The image forming apparatus 1 forms an image on the recording medium using toner supplied from a toner cartridge 2. In an example, the image forming apparatus 1 receives the toner from the toner cartridge 2 and forms an image on the recording medium using the received toner. The image forming apparatus 1 receives toners from a plurality of toner cartridges 2 that store toners of different colors such as cyan, magenta, yellow, and black and forms a toner image. In the image forming apparatus 1, a vertical direction (a direction indicated by an arrow ZA and an arrow ZB) along the gravity direction, a width direction (a direction indicated by an arrow XA and an arrow XB) crossing (preferably orthogonal or substantially orthogonal to) the vertical direction, and a depth direction crossing (preferably orthogonal or substantially orthogonal to) both of the vertical direction and the width direction are defined.

As illustrated in FIG. 1, the image forming apparatus 1 includes a housing 11, a communication interface 12, a system controller 13, a display unit 14, an operation interface 15, paper feeding cassettes 16, a paper discharge tray 17, a conveying mechanism 18, an image forming unit 19, and a fixing device 20.

The housing 11 is a main body of the image forming apparatus 1. The housing 11 houses the communication interface 12, the system controller 13, the display unit 14, the operation interface 15, the paper feeding cassettes 16, the paper discharge tray 17, the conveying mechanism 18, the image forming unit 19, and the fixing device 20.

The communication interface 12 is an interface that relays communication with other equipment. The communication interface 12 is used for, for example, communication with a client. The client is an information processing device such as a personal computer, a smartphone, or a tablet PC. The communication interface 12 may wirelessly communicate with the client according to a standard such as Bluetooth (registered trademark) or Wi-fi (registered trademark).

The system controller 13 controls the image forming apparatus 1. The system controller 13 includes, for example, a processor 21 and a memory 22. The processor 21 is an arithmetic element that executes arithmetic processing. The processor 21 is, for example, a CPU. The processor 21 executes processing based on data such as programs stored in the memory 22. The processor 21 executes the programs stored in the memory 22 to thereby function as a control unit capable of executing various operations. The memory 22 is a storage medium that stores the programs and data and the like used in the programs. The memory 22 functions as a working memory. That is, the memory 22 temporarily stores data being processed by the processor 21 and the programs and the like to be executed by the processor 21.

The processor 21 controls, for example, transmission and reception of data by the communication interface 12, screen display by the display unit 14, operation input by the operation interface 15, conveyance of a recording medium by the conveying mechanism 18, image formation processing by the image forming unit 19, and fixing processing by the fixing device 20. The processor 21 generates a printing job based on an image acquired from external equipment via the communication interface 12. The processor 21 stores the generated printing job in the memory 22. The printing job includes image data indicating an image to be formed on a recording medium. The image data may be data for forming an image on one recording medium or may be data for forming images on a plurality of recording media. The printing job includes information indicating that the printing job is color printing or monochrome printing.

The processor 21 executes a program stored in the memory 22 to thereby function as a controller (an engine controller) that controls the operations of the conveying mechanism 18, the image forming unit 19, and the fixing device 20. That is, the processor 21 controls conveyance of a recording medium by the conveying mechanism 18. The processor 21 controls formation of an image on the recording medium by the image forming unit 19. The processor 21 controls fixing of the image on the recording medium by the fixing device 20.

The image forming apparatus 1 may include the engine controller separately from the system controller 13. In an example, the image forming apparatus 1 may include engine controllers respectively corresponding to the conveying mechanism 18, the image forming unit 19, and the fixing device 20. That is, the image forming apparatus 1 may include an engine controller that controls conveyance of a recording medium by the conveying mechanism 18, an engine controller that controls formation of an image on the recording medium by the image forming unit 19, and an engine controller that controls fixing of the image on the recording medium by the fixing device 20. In this case, the system controller 13 supplies information necessary for control of the engine controllers to the engine controllers.

The display unit 14 includes a display that displays a screen according to a video signal input thereto. For example, a screen for performing various settings of the image forming apparatus 1 is displayed on the display of the display unit 14. The operation interface 15 includes an operation member that generates an operation signal based on operation of a user. The paper feeding cassettes 16 are cassettes that store recording media. Recording media can be supplied to the paper feeding cassettes 16 from the outside of the housing 11. In an example, the paper feeding cassettes 16 can be pulled out from the housing 11. The paper discharge tray 17 is a tray that supports recording media discharged from the image forming apparatus 1.

The conveying mechanism 18 supplies a recording medium for printing to the image forming unit 19 and discharges, from the housing 11, the recording medium on which an image is formed by the image forming unit 19. The conveying mechanism 18 includes a paper feed conveyance path 31 and a paper discharge conveyance path 32. The paper feed conveyance path 31 and the paper discharge conveyance path 32 move a recording medium. The paper feed conveyance path 31 takes in a recording medium from the paper feeding cassettes 16 and feeds the taken-in recording medium to the image forming unit 19. The paper feed conveyance path 31 includes pickup rollers 33 corresponding to the paper feeding cassettes 16. The pickup rollers 33 take the recording media stored in the paper feeding cassettes 16 into the paper feed conveyance path 31. The paper discharge conveyance path 32 is a conveyance path for discharging, from the housing 11, a recording medium on which an image is formed. The paper discharge tray 17 supports the recording medium discharged by the paper discharge conveyance path 32.

The image forming unit 19 forms an image on a recording medium. The image forming unit 19 forms an image on the recording medium, for example, based on a printing job generated by the processor 21. The image forming unit 19 includes a plurality of process units 42, a plurality of optical scanning devices 43, and a transfer mechanism 44. The plurality of process units 42 are provided for each of types of toners. For example, the plurality of process units 42 are provided for each of color toners of cyan, magenta, yellow, black, and the like. The toner cartridges 2 including toners of different colors are respectively connected to the plurality of process units 42. Since the plurality of process units 42 have the same configuration, one process unit 42 is explained.

The process unit 42 includes a photoconductive drum 51, an electrifying charger 52, and a developing device 53. The photoconductive drum 51 is a photoconductive body including a cylindrical drum and a photoconductive layer provided on the outer circumferential surface of the drum. The photoconductive drum 51 rotates at constant speed. The electrifying charger 52 uniformly charges the surface of the photoconductive drum 51. The electrifying charger 52 applies a voltage to the photoconductive drum 51 to thereby charge the photoconductive drum 51 to uniform negative polarity potential. The developing device 53 causes toner to adhere to the photoconductive drum 51. The developing device 53 includes a developer container, an agitating mechanism, a developing roller, and a doctor blade.

The developer container is a container that receives toner fed from the toner cartridge 2 and stores the toner. A carrier is stored in the developer container in advance. The agitating mechanism mixes the toner fed from the toner cartridge 2 and the carrier. A mixture of the toner and the carrier is a developer. The carrier is stored in the developer container, for example, when the developing device 53 is manufactured. The developing roller rotates in the developer container, whereby the developer adheres to the surface of the developing roller. The doctor blade is disposed apart from the surface of the developing roller. The doctor blade removes a part of the developer adhering to the surface of the rotating developing roller. Consequently, a layer of the developer is formed on the surface of the developing roller. The thickness of the layer of the developer is, for example, thickness corresponding to the distance between the doctor blade and the surface of the developing roller.

The optical scanning device 43 is, for example, an electrophotographic optical scanning device in which an LSU (Laser Scanning Unit) is used. The optical scanning device 43 outputs laser light corresponding to an image to be printed and irradiates the charged photoconductive drum 51 of the process unit 42 with the laser light. The optical scanning device 43 deflects the laser light for scanning in the main scanning direction, which is a direction along the rotation axis of the photoconductive drum 51. Consequently, the optical scanning device 43 forms an electrostatic latent image for one line on the photoconductive drum 51. The optical scanning device 43 continuously irradiates the rotating photoconductive drum 51 with light to thereby form electrostatic latent images for a plurality of lines on the photoconductive drum 51. In this state, if the layer of the developer formed on the surface of the developing roller of the developing device 53 approaches the surface of the photoconductive drum 51, the toner included in the developer adheres to the electrostatic latent image formed on the surface of the photoconductive drum 51. Consequently, a toner image is formed on the surface of the photoconductive drum 51. A detailed configuration of the optical scanning device 43 is explained below.

The transfer mechanism 44 is a component that transfers the toner image formed on the surface of the photoconductive drum 51 to a recording medium. The transfer mechanism 44 includes, for example, a primary transfer belt 61, a secondary transfer counter roller 62, a plurality of primary transfer rollers 63, and a secondary transfer roller 64. The primary transfer belt 61 is an endless belt wound on the secondary transfer counter roller 62 and a plurality of winding rollers. The inner circumferential surface, which is the surface on the inner side, of the primary transfer belt 61 is in contact with the secondary transfer counter roller 62 and the plurality of winding rollers. The outer circumferential surface, which is the surface on the outer side, of the primary transfer belt 61 is opposed to the photoconductive drum 51 of the process unit 42.

The secondary transfer counter roller 62 rotates to thereby convey the primary transfer belt 61 in a predetermined conveying direction. The plurality of winding rollers are configured to be capable of freely rotating. The plurality of winding rollers rotate according to the movement of the primary transfer belt 61 by the secondary transfer counter roller 62.

The plurality of primary transfer rollers 63 are configured to respectively bring the primary transfer belt 61 into contact with the photoconductive drums 51 of the plurality of process units 42. The plurality of primary transfer rollers 63 are provided to correspond to the photoconductive drums 51 of the plurality of process units 42. Specifically, the plurality of primary transfer rollers 63 are respectively provided in positions opposed to, across the primary transfer belt 61, the photoconductive drums 51 of the process units 42 corresponding thereto. The primary transfer rollers 63 come into contact with the inner circumferential surface side of the primary transfer belt 61 and displace the primary transfer belt 61 to the photoconductive drum 51 side. Consequently, the primary transfer rollers 63 bring the outer circumferential surface of the primary transfer belt 61 into contact with the photoconductive drums 51.

The secondary transfer roller 64 is provided in a position opposed to the primary transfer belt 61. The secondary transfer roller 64 comes into contact with and applies pressure to the outer circumferential surface of the primary transfer belt 61. Consequently, a transfer nip in which the secondary transfer roller 64 and the outer circumferential surface of the primary transfer belt 61 adhere is formed. If a recording medium passes through the transfer nip, the secondary transfer roller 64 presses the recording medium passing through the transfer nip against the outer circumferential surface of the primary transfer belt 61.

The secondary transfer roller 64 and the secondary transfer counter roller 62 rotate to thereby convey, in a sandwiched state, a recording medium fed from the paper feeding cassette 16 by the conveying mechanism 18. Consequently, the recording medium passes through the transfer nip.

In the configuration explained above, if the outer circumferential surface of the primary transfer belt 61 comes into contact with the photoconductive drum 51, a toner image formed on the surface of the photoconductive drum 51 is transferred onto the outer circumferential surface of the primary transfer belt 61. If the image forming unit 19 includes the plurality of process units 42, the primary transfer belt 61 receives toner images from the photoconductive drums 51 of the plurality of process units 42. The toner image transferred onto the outer circumferential surface of the primary transfer belt 61 is conveyed by the primary transfer belt 61 to the transfer nip in which the secondary transfer roller 64 and the outer circumferential surface of the primary transfer belt 61 adhere. If a recording medium is present in the transfer nip, the toner image transferred onto the outer circumferential surface of the primary transfer belt 61 is transferred onto the recording medium in the transfer nip.

A configuration concerning fixing by the image forming apparatus 1 is explained. The fixing device 20 melts toner transferred onto a recording medium and fixes a toner image. The fixing device 20 operates based on control by the system controller 13. The fixing device 20 includes a heating member that applies heat to the recording medium and a pressurizing member that applies pressure to the recording medium. For example, the heating member is, for example, a heat roller 81. For example, the pressurizing member is a press roller 82.

The heat roller 81 is a rotating body for fixing that rotates. The heat roller 81 includes a cored bar formed of metal in a hollow shape and an elastic layer formed on the outer circumference of the cored bar. The heat roller 81 is heated to high temperature by a heater disposed on the inner side of the cored bard formed in the hollow shape. The heater is, for example, a halogen heater. The heater may be an induction heating (IH) heater that heats the cored bard with electromagnetic induction.

The press roller 82 is provided in a position opposed to the heat roller 81. The press roller 82 includes a cored bard formed of metal in a predetermined outer diameter and an elastic layer formed on the outer circumference of the cored bar. The press roller 82 applies pressure to the heat roller 81. The pressure is applied to the heat roller 81 from the press roller 82, whereby a fixing nip in which the press roller 82 and the heat roller 81 adhere is formed. The press roller 82 rotates to thereby move a recording medium entering the fixing nip and press the recording medium against the heat roller 81.

With the configuration explained above, the heat roller 81 and the press roller 82 apply heat and pressure to the recording medium passing through the fixing nip. Consequently, a toner image is fixed to the recording medium having passed through the fixing nip. The recording medium having passed through the fixing nip is discharged to the outside of the housing 11 by the conveying mechanism 18. The fixing device 20 is not limited to the configuration explained above. The fixing device 20 may be configured in an on-demand scheme for applying, via a film-like member, heat to the recording medium onto which the toner image is transferred and melting the toner to fix the toner image.

Figure 2:
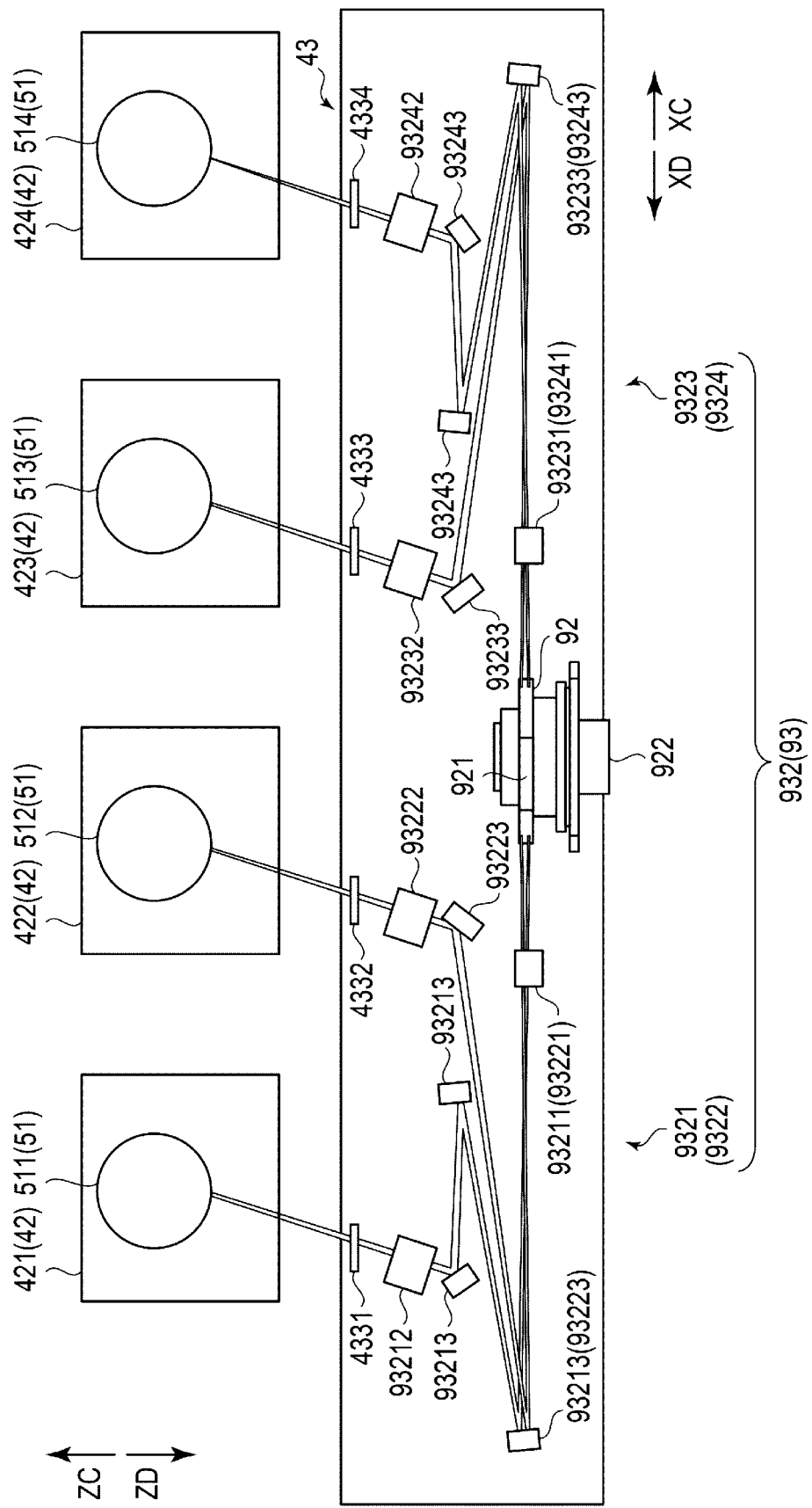
FIG. 2 is a schematic diagram of the optical scanning device according to the first embodiment viewed from one side in a main scanning direction.

The optical scanning device 43 is explained in detail. FIG. 2 is a schematic diagram of the optical scanning device 43 viewed from one side in the main scanning direction. In FIG. 2, the plurality of process units 42 and the plurality of photoconductive drums 51 are illustrated in addition to the optical scanning device 43. In the optical scanning device 43, a height direction (a direction indicated by an arrow ZC and an arrow ZD), a first direction (a direction indicated by an arrow XC and an arrow XD) crossing the height direction, and a second direction crossing both of the height direction and the first direction are defined. The optical scanning device 43 is provided in the image forming apparatus 1 in a posture in which the height direction is along the vertical direction. At this time, the first direction is along a sub-scanning direction of the image forming apparatus 1 and the second direction is along a main scanning direction of the image forming apparatus 1.

The optical scanning device 43 corresponds to, for example, an LSU (Laser Scanning Unit). In the optical scanning device 43, a polygon mirror 92 explained below is disposed in the center in the sub-scanning direction and optical element groups for scanning are disposed on both sides of the polygon mirror 92 in the sub-scanning direction. In an example illustrated in FIG. 2, the plurality of process units 42 are disposed in the order of a process unit 421 for yellow, a process unit 422 for magenta, a process unit 423 for cyan, and a process unit 424 for black from a far side from the transfer nip in the sub-scanning direction of the image forming apparatus 1.

Figure 3:
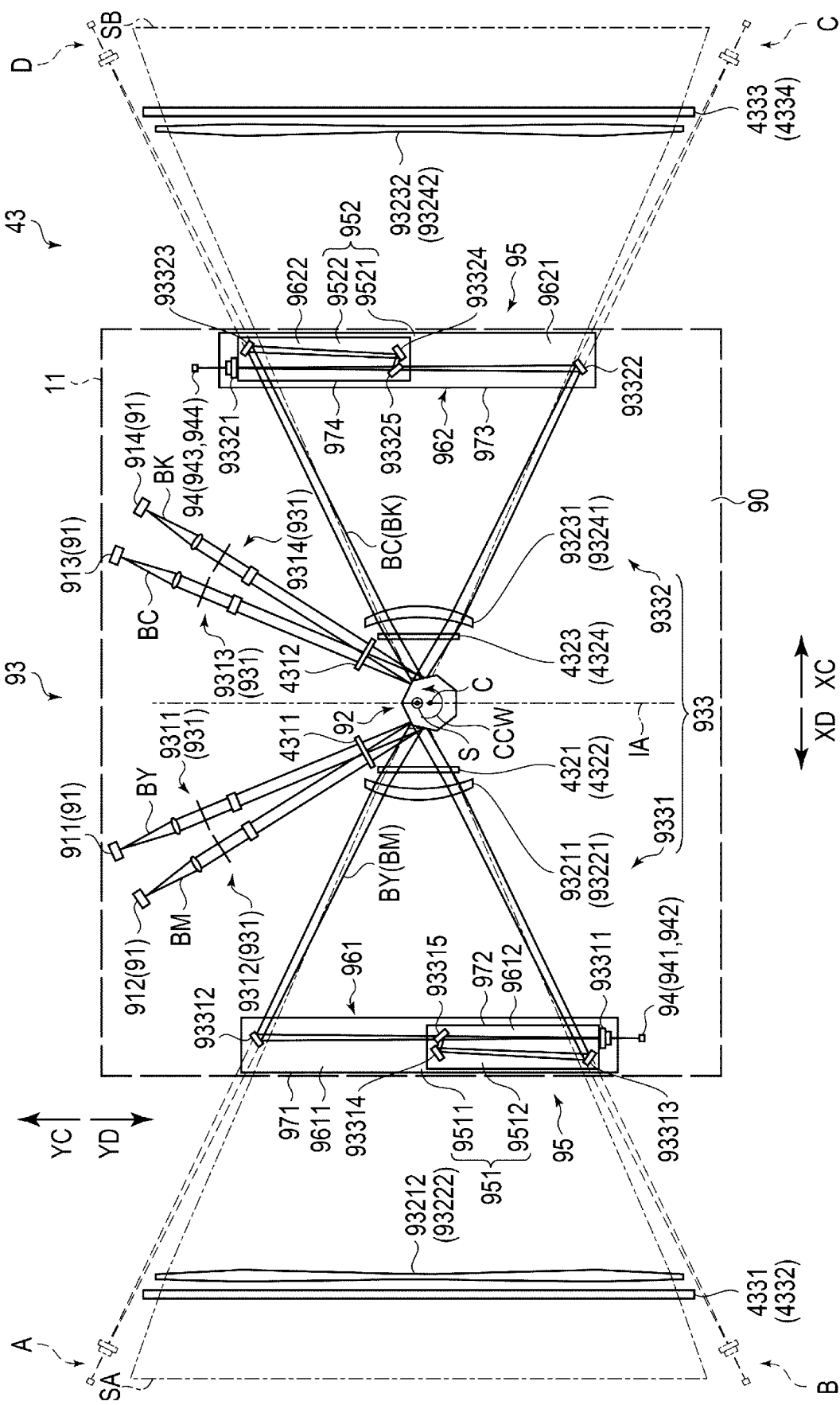
FIG. 3 is a schematic diagram of the optical scanning device viewed from the upper side in the height direction and in a state in which an optical path by an optical element group for scanning is developed.

FIG. 3 is a schematic diagram of the optical scanning device 43 viewed from the upper side in the height direction. In FIG. 3, as in FIG. 2, the height direction, the first direction (indicated by an arrow YC and an arrow YD), and the second direction are defined. Regions SA and SB are ranges (image ranges) in which laser light is moved by being deflected for scanning. In order to indicate an optical path not turned back by turning back mirrors 93312 to 93315 and 93322 to 93325 explained below, imaginary positions A to D, which are imaginary positions of optical correction elements 93311 and 93321 and photodetectors 941 to 944 explained below, are indicated by broken lines.

In FIG. 3, optical element groups for scanning 9321 to 9324 illustrated in FIG. 2 are developed and illustrated. Accordingly, turning back mirrors 93213, 93223, 93233, and 93234 explained below are omitted. Since optical path lengths are the same, in FIG. 3, fθ lenses 93212 and 93222, fθ lenses 93232 and 93242, second cover glasses 4321 and 4322, second cover glasses 4323 and 4324, third cover glasses 4331 and 4332, and third cover glasses 4333 and 4334 are respectively illustrated in the same positions.

As illustrated in FIG. 3, the optical scanning device 43 includes a main body 90, a plurality of laser light sources 91, a polygon mirror 92, a plurality of optical element groups 93, a plurality of photodetectors 94, and a plurality of assembly bases 95.

The main body 90 is formed as a base plate to which the plurality of laser light sources 91, the polygon mirror 92, and the plurality of photodetectors 94 are attached.

The laser light sources 91 are light sources that output laser lights. The laser light sources 91 are, for example, laser diodes. The laser light sources 91 are provided, for example, for each of the process units 42. That is, the laser light sources 91 are respectively provided for cyan, magenta, yellow, black, and the like. Therefore, as illustrated in FIG. 3, the laser light sources 91 include a laser light source 911 for yellow, a laser light source 912 for magenta, a laser light source 913 for cyan, and a laser light source 914 for black.

As illustrated in FIG. 2, the polygon mirror 92 is a rotary polygon mirror that includes a plurality of reflection surfaces 921 for reflecting the laser lights output from the laser light sources 91 and rotates at constant speed. The polygon mirror 92 is formed in, for example, a heptagonal prism shape. Seven reflection surfaces are provided on side surfaces of the polygon mirror 92. The polygon mirror 92 rotates by being driven to rotate by a driving mechanism 922. The polygon mirror 92 rotates around a center axis C extending along the height direction. As illustrated in FIG. 3, the polygon mirror 92 is provided in the center or substantially the center of the optical scanning device 43 in both of the main scanning direction and the sub-scanning direction. That is, the polygon mirror 92 is provided in the center of the optical scanning device 43. The polygon mirror 92 is driven to rotate by the driving mechanism 922 explained above to rotate around the center axis C in a direction of an arrow CCW (the counterclockwise direction when viewed from the upper side in the height direction). The rotating direction CCW of the polygon mirror 92 is not limited to this.

Consequently, angles of the reflection surfaces 921 with respect to incident directions of laser lights relatively change. The polygon mirror 92 reflects the laser lights output from the laser light sources 91 with the reflection surfaces 921 while being rotated at constant speed by the driving mechanism 922 to thereby temporally change traveling directions of the laser lights. Consequently, the polygon mirror 92 deflects lights (beams) BY, BM, BC, and BK emitted from the laser light sources 91 (911 to 914) for scanning in the main scanning direction respectively on the photoconductive drums 511 to 514 of the process units 421 to 424. In FIG. 3, the polygon mirror 92 rotates as explained above, whereby the beams BY and BM are deflected for scanning to the arrow YD side along the main scanning direction and the beams BC and BK are deflected for scanning to the arrow YC side along the main scanning direction.

The optical element group 93 guides the laser lights emitted from the laser light sources 91 and cause the laser lights to pass on predetermined optical paths. In this embodiment, the optical element group 93 includes incident light optical element groups 931, optical element groups for scanning 932, and an optical element group for synchronization 933. The incident light optical element groups 931 make the laser lights output from the laser light sources 91 incident on the polygon mirror 92. The optical element groups for scanning 932 guides the laser lights reflected by the reflection surfaces 921 of the polygon mirror 92 and makes the laser lights incident on the photoconductive drum 51. The optical element group for synchronization 933 guides, in predetermined positions, the laser lights reflected by the reflection surfaces 921 of the polygon mirror 92 and makes the laser lights incident on the photodetectors 94.

The photodetectors 94 are beam detectors that detect the laser lights output from the laser light sources 91 and reflected by the polygon mirror 92. The photodetectors 94 are called BD sensors as well. The photodetectors 94 include, for example, photodiodes, phototransistors, or elements that generate electric signals according to other light. If detecting the laser lights, the photodetectors 94 output beam detect signals (BD signals). The photodetectors 94 are disposed on the optical paths of the laser lights reflected by the polygon mirror 92. The photodetectors 94 are respectively provided in the process units 421 to 424. That is, the photodetectors 94 are respectively provided for cyan, magenta, yellow, and black. Therefore, the photodetectors 94 include a photodetector 941 for yellow, a photodetector 942 for magenta, a photodetector 943 for cyan, and a photodetector 944 for black.

In this case, the photodetector 941 for yellow is disposed on an optical path of laser light output from the laser light source 911 for yellow and reflected by the polygon mirror 92. The photodetector 942 for magenta is disposed on an optical path of laser light output from the laser light source 912 for magenta and reflected by the polygon mirror 92. The photodetector 943 for cyan is disposed on an optical path of laser light output from the laser light source 913 for cyan and reflected by the polygon mirror 92. The photodetector 944 for black is disposed on an optical path of laser light output from the laser light source 914 for black and reflected by the polygon mirror 92.

In this embodiment, the photodetector 941 for yellow and the photodetector 942 for magenta are provided in the same or substantially the same position in both of the main scanning direction and the sub-scanning direction. The photodetector 941 for yellow and the photodetector 942 for magenta are provided in the optical scanning device 43 in a posture in which photodetection surfaces face one direction of the main scanning direction. The photodetector 943 for cyan and the photodetector 944 for black are provided in the same or substantially the same position in both of the main scanning direction and the sub-scanning direction. The photodetector 943 for cyan and the photodetector 944 for black are provided in the optical scanning device 43 in a posture in which photodetection surfaces face one direction of the main scanning direction. However, the photodetector 943 for cyan and the photodetector 944 for black are provided in positions opposite to the photodetector 941 for yellow and the photodetector 942 for magenta centering on an imaginary axis of symmetry S explained below on the polygon mirror 92. The photodetector 943 for cyan and the photodetector 944 for black face directions opposite to the photodetector 941 for yellow and the photodetector 942 for magenta in the main scanning direction.

The incident light optical element groups 931, the optical element groups for scanning 932, and the optical element group for synchronization 933 are explained. As explained above, in the optical scanning device 43, since the laser light sources 91 are provided for each of the process units 42, the incident light optical element groups 931 are also provided for each of the process units 42. That is, the laser light output from the laser light source 911 for yellow is guided to the polygon mirror 92 by an incident light optical element group 9311 for yellow. The laser light output from the laser light source 912 for magenta is guided to the polygon mirror 92 by an incident light optical element group 9312 for magenta. The laser light output from the laser light source 913 for cyan is guided to the polygon mirror 92 by an incident light optical element group 9313 for cyan. The laser light output from the laser light source 914 for black is guided to the polygon mirror 92 by an incident light optical element group 9314 for black.

As illustrated in FIG. 3, in the optical scanning device 43, the laser light sources 91 (911 to 914) and the incident light optical element groups 931 (9311 to 9314) are provided further on one side in the main scanning direction than the polygon mirror 92. The laser light source 911 for yellow, the incident light optical element group 9311 for yellow, the laser light source 912 for magenta, and the incident light optical element group 9312 for magenta are provided further on one side in the sub-scanning direction than the polygon mirror 92. The laser light source 913 for cyan, the incident light optical element group 9313 for cyan, the laser light source 914 for black, and the incident light optical element group 9314 for black are provided further on the opposite of the one side in the sub-scanning direction than the polygon mirror 92. Therefore, the incident light optical systems concerning yellow and magenta are provided on the one side in the sub-scanning direction and the incident light optical systems concerning cyan and black are provided on the opposite side of the one side in the sub-scanning direction. The incident light optical systems corresponding to the colors include the laser light sources corresponding to the colors and the incident light optical element groups corresponding to the colors. The incident light optical systems are called pre-deflection optical systems as well. Two combinations selected from yellow, magenta, cyan, and black are not limited to the combinations explained above. In an example, the incident light optical systems concerning yellow and cyan may be provided on the one side in the sub-scanning direction and the incident light optical systems concerning magenta and black may be provided on the opposite side of the one side in the sub-scanning direction.

Figure 4:
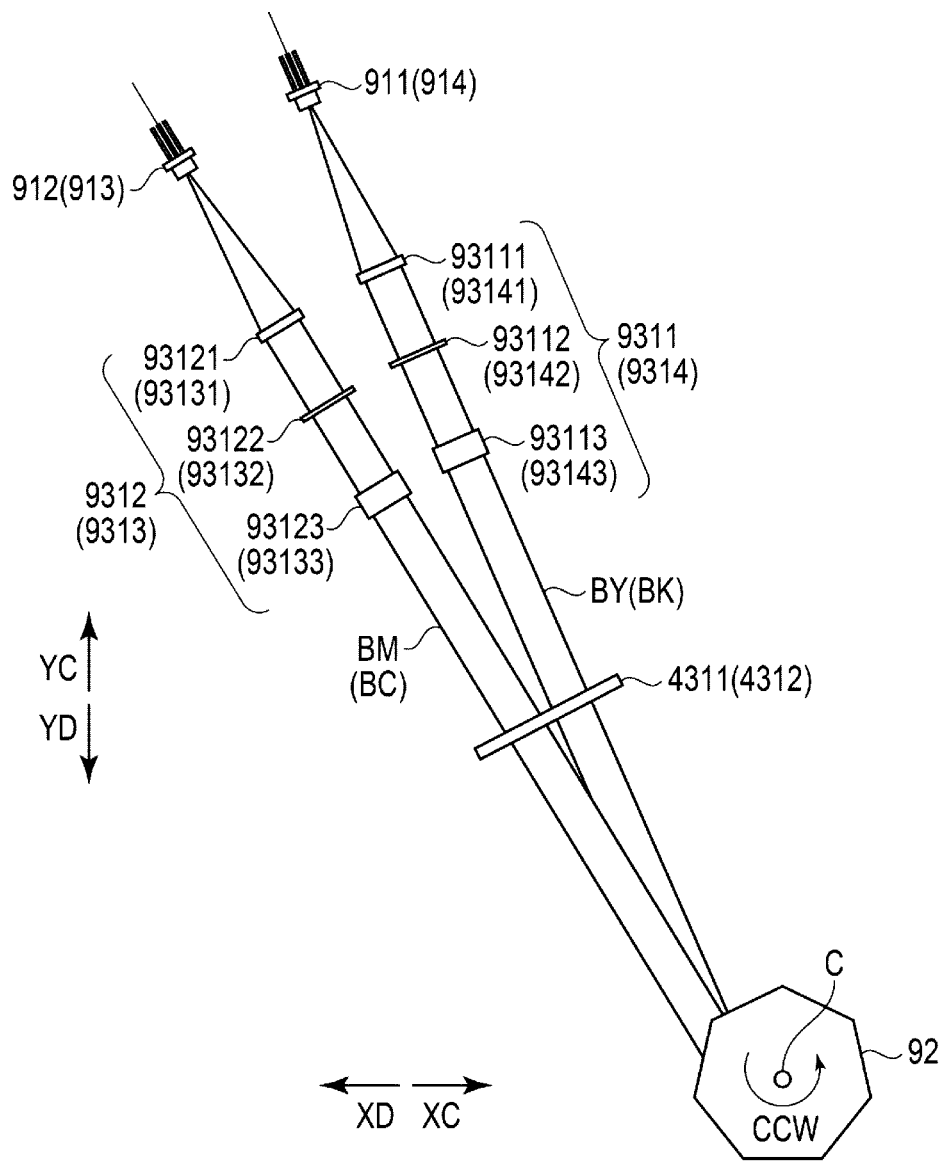
FIG. 4 is a schematic diagram of an incident light optical system provided in the optical scanning device viewed from the upper side in the height direction.
Figure 5:
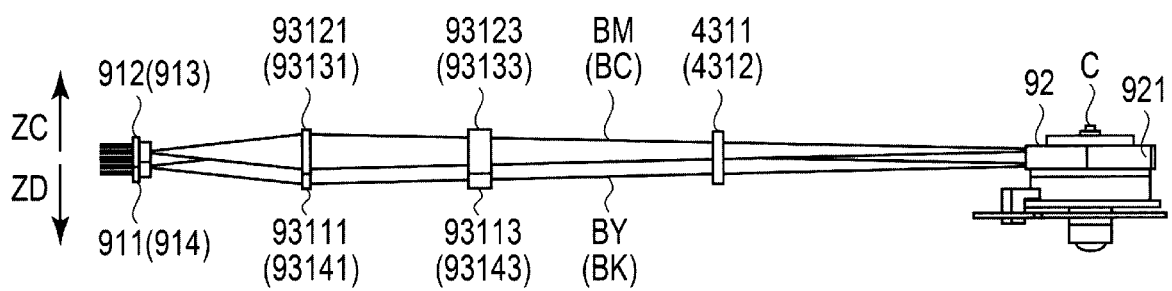
FIG. 5 is a schematic diagram of the incident light optical system provided in the optical scanning device viewed from a direction different from the direction in FIG. 4.

FIGS. 4 and 5 are schematic diagrams illustrating the incident light optical element group 9311 for yellow and the incident light optical element group 9312 for magenta. In FIGS. 4 and 5, as in FIG. 2, the height direction, the first direction, and the second direction are defined. FIG. 4 is a diagram of the incident light optical element group 9311 for yellow and the incident light optical element group 9312 for magenta viewed from the upper side in the height direction. FIG. 5 is a diagram of the incident light optical element group 9311 for yellow and the incident light optical element group 9312 for magenta viewed from a side where the incident light optical element group 9312 for magenta is located in a direction crossing a traveling direction of laser light.

The incident light optical element group 9311 for yellow includes a collimator lens 93111, a diaphragm 93112, and a cylinder lens 93113. The beam BY emitted from the laser light source 911 for yellow passes through the collimator lens 93111, the diaphragm 93112, and the cylinder lens 93113 in this order and is made incident on the polygon mirror 92. The collimator lens 93111 suppresses diffusion of the beam BY. For example, the collimator lens 93111 collimates the beam BY into parallel light. The diaphragm 93112 adjusts a shape of the beam BY on a surface crossing a traveling direction of the beam BY having passed through the collimator lens 93111. The cylinder lens 93113 adjusts a shape in the height direction of the beam BY having passed through the diaphragm 93112. Accordingly, the beam BY decreases in the spread in the height direction from the laser light source 911 for yellow toward the polygon mirror 92. That is, the beam BY decreases in the spread in the height direction while being kept as the parallel light. The incident light optical element group 9312 for magenta has the same configuration as the configuration of the incident light optical element group 9311 for yellow and includes a collimator lens 93121, a diaphragm 93122, and a cylinder lens 93123.

As illustrated in FIG. 5, in the optical scanning device 43, the laser light source 912 for magenta is provided further on the upper side in the height direction than the laser light source 911 for yellow. The incident light optical element group 9312 for magenta is provided further on the upper side in the height direction than the incident light optical element group 9311 for yellow. Accordingly, as explained above, the beam BM guided from the laser light source 912 for magenta to the polygon mirror 92 is made incident on the reflection surface 921 of the polygon mirror 92 further on the upper side in the height direction than the beam BY guided from the laser light source 911 for yellow to the polygon mirror 92.

In the same configuration as the configuration of the incident light optical element group 9311 for yellow, the incident light optical element group 9313 for cyan includes a collimator lens 93131, a diaphragm 93132, and a cylinder lens 93133 and the incident light optical element group 9314 for black includes a collimator lens 93141, a diaphragm 93142, and a cylinder lens 93143. The same relation as the relation illustrated in FIGS. 4 and 5 holds about the incident light optical systems concerning cyan and black as well. At this time, the incident light optical system concerning cyan corresponds to the incident light optical system concerning magenta and the incident light optical system concerning black corresponds to the incident light optical system concerning yellow. Accordingly, the beam BC guided from the laser light source 913 for cyan to the polygon mirror 92 is made incident on the reflection surface 921 of the polygon mirror 92 further on the upper side in the height direction than the beam BK guided from the laser light source 914 for black to the polygon mirror 92.

As illustrated in FIG. 2, the optical element groups for scanning 932 guide the laser lights reflected by the reflection surfaces 921 of the polygon mirror 92 and make the laser lights incident on the photoconductive drum 51. The optical element groups for scanning 932 are provided for each of the process units 42. That is, the optical element groups for scanning 932 are respectively provided for cyan, magenta, yellow, and black. Therefore, the optical element groups for scanning 932 include the optical element group for scanning 9321 for yellow, the optical element group for scanning 9322 for magenta, the optical element group for scanning 9323 for cyan, and the optical element group for scanning 9324 for black. The optical element groups for scanning are called post-deflection optical systems as well.

In this case, the optical element group for scanning 9321 for yellow makes the beam BY reflected by the polygon mirror 92 after being emitted from the laser light source 911 for yellow incident on the photoconductive drum 511 for yellow of the process unit 421 for yellow. The optical element group for scanning 9322 for magenta makes the beam BM reflected by the polygon mirror 92 after being emitted from the laser light source 912 for magenta incident on the photoconductive drum 512 for magenta of the process unit 422 for magenta. The optical element group for scanning 9323 for cyan makes the beam BC reflected by the polygon mirror 92 after being emitted from the laser light source 913 for cyan incident on the photoconductive drum 513 for cyan of the process unit 423 for cyan. The optical element group for scanning 9324 for black makes the beam BK reflected by the polygon mirror 92 after being emitted from the laser light source 914 for black incident on the photoconductive drum 514 for black of the process unit 424 for black.

The optical element group for scanning 9321 for yellow includes fθ lenses 93211 and 93212 and the turning back mirror 93213. The beam BY deflected for scanning by the polygon mirror 92 rotating at constant speed passes through the fθ lenses 93211 and 93212, whereby the fθ lenses 93211 and 93212 deflect a condensing spot of the beam BY for scanning at constant speed on a focal plane. The turning back mirror 93213 reflects the beam BY. The turning back mirror 93213 guides the beam BY having passed through one fθ lens 93211 to cause the beam BY to pass through the other fθ lens 93211. The disposition of the turning back mirror 93213 is not particularly limited and can be set as appropriate considering the configuration such as disposition of other optical elements. In the optical element group for scanning 9321 for yellow in this embodiment, three turning back mirrors 93213 are disposed in an optical path between the fθ lenses 93211 and 93212. In this case, the beam BY is reflected three times and guided from the fθ lens 93211 to the fθ lens 93212.

Like the optical element group for scanning 9321 for yellow, the optical element group for scanning 9322 for magenta includes fθ lenses 93221 and 93222 and the turning back mirror 93223. However, two turning back mirrors 93233 are disposed in an optical path between the fθ lenses 93221 and 93222. In this case, the beam BM is reflected twice and guided from the fθ lens 93221 to the fθ lens 93222. As illustrated in FIG. 2, in this embodiment, as the fθ lens 93211 and the fθ lens 93221, the same lens is used in the optical element group for scanning 9321 for yellow and the optical element group for scanning 9322 for magenta. As the turning back mirror 93213 and the turning back mirror 93223, the same turning back mirror is used in the optical element group for scanning 9321 for yellow and the optical element group for scanning 9322 for magenta.

The optical element group for scanning 9323 for cyan has the same configuration as the configuration of the optical element group for scanning 9322 for magenta and includes fθ lenses 93231 and 93232 and the turning back mirror 93233. Two turning back mirrors 93213 are disposed in an optical path between the fθ lenses 93231 and 93222. The beam BC is reflected twice by the turning back mirror 93233 and guided from the fθ lens 93231 to the fθ lens 93232. The optical element group for scanning 9324 for black has the same configuration as the configuration of the optical element group for scanning 9321 for yellow and includes fθ lenses 93241 and 93242 and a turning back mirror 93243. Three turning back mirrors 93243 are disposed in an optical path between the fθ lenses 93241 and 93242. The beam BK is reflected three times by the turning back mirror 93243 and guided from the fθ lens 93241 to the fθ lens 93242. As illustrated in FIG. 2, in this embodiment, as the fθ lens 93231 and the fθ lens 93241, the same lens is used in the optical element group for scanning 9323 for cyan and the optical element group for scanning 9324 for black. As the turning back mirror 93233 and the turning back mirror 93243, the same turning back mirror is used in the optical element group for scanning 9323 for cyan and the optical element group for scanning 9324 for black.

The optical scanning device 43 includes first cover glasses 4311 and 4312, second cover glasses 4321 to 4324, and third cover glasses 4331 to 4334. The first cover glasses 4311 and 4312 and the second cover glasses 4321 to 4324 suppress a leak of wind noise at the time when the polygon mirror 92 rotates. The third cover glasses 4331 to 4334 cover emission ports through which the beams BY, BM, BC, and BK are emitted from the housing of the optical scanning device 43.

As illustrated in FIGS. 3 to 5, the first cover glass 4311 is provided on an optical path between the incident light optical systems concerning yellow and magenta and the polygon mirror 92 and the first cover glass 4312 is provided on an optical path between the incident light optical systems concerning cyan and black and the polygon mirror 92. In this embodiment, the first cover glass 4311 is provided between the cylinder lenses 93123 and 93113 and the polygon mirror 92 and the first cover glass 4312 is provided between the cylinder lenses 93133 and 93143 and the polygon mirror 92.

As illustrated in FIG. 3, the second cover glasses 4321 to 4324 are provided on optical paths between the optical element groups for scanning 9321 to 9324 and the polygon mirror 92. In this embodiment, the second cover glasses 4321 and 4322 are provided between the fθ lenses 93211 and 93221 and the polygon mirror 92 and the second cover glasses 4323 and 4324 are provided between the fθ lenses 93231 and 93241 and the polygon mirror 92.

As illustrated in FIGS. 2 and 3, the third cover glasses 4331 to 4334 are provided on optical paths between the optical element groups for scanning 9321 to 9324 and the photoconductive drums 511 to 514. In this embodiment, the third cover glass 4331 is provided on an optical path between the fθ lens 93212 and the photoconductive drum 511 for yellow and the third cover glass 4332 is provided on an optical path between the fθ lens 93222 and the photoconductive drum 512 for magenta. The third cover glass 4333 is provided on an optical path between the fθ lens 93232 and the photoconductive drum 513 for cyan and the third cover glass 4334 is provided on an optical path between the fθ lens 93242 and the photoconductive drum 514 for black.

As illustrated in FIG. 3, the optical element group for synchronization 933 includes a first optical element group for synchronization 9331 and a second optical element group for synchronization 9332. The first optical element group for synchronization 9331 guides the beam BY and the beam BM deflected for scanning by the polygon mirror 92 to make the beam BY incident on the photodetector 941 for yellow and make the beam BM incident on the photodetector 942 for magenta. The second optical element group for synchronization 9332 guides the beam BC and the beam BK deflected for scanning by the polygon mirror 92 to make the beam BC incident on the photodetector 943 for cyan and make the beam BK incident on the photodetector 944 for black. Accordingly, the first optical element group for synchronization 9331 is provided on the side of the photodetector 941 for yellow and the photodetector 942 for magenta in the sub-scanning direction and the second optical element group for synchronization 9332 is provided on the side of the photodetector 943 for cyan and the photodetector 944 for black in the sub-scanning direction.

In other words, an optical system for synchronization concerning yellow and magenta is provided on one side in the sub-scanning direction and an optical system for synchronization concerning cyan and black is provided on the opposite side of the one side in the sub-scanning direction. The optical system for synchronization concerning yellow and magenta includes the photodetector 941 for yellow, the photodetector 942 for magenta, and the first optical element group for synchronization 9331. The optical system for synchronization concerning cyan and black includes the photodetector 943 for cyan, the photodetector 944 for black, and the second optical element group for synchronization 9332. Combinations of the colors allocated to the optical systems for synchronization are not limited to the combinations explained above. The combinations can be set as appropriate according to, for example, disposition of the incident light optical systems for the colors.

The first optical element group for synchronization 9331 and the second optical element group for synchronization 9332 are rotationally symmetrical with respect to the imaginary axis of symmetry S parallel to a rotation axis C of the polygon mirror 92. The axis of symmetry S crosses an imaginary crossing axis IA parallel to the main scanning direction. That is, the first optical element group for synchronization 9331 and the second optical element group for synchronization 9332 are point symmetrical with respect to the axis of symmetry S. The rotation axis C of the polygon mirror 92 and the axis of symmetry S are separated. The laser light source 911 for yellow and the laser light source 913 for cyan are set in positions symmetrical with respect to the crossing axis IA. The laser light source 912 for magenta and the laser light source 914 for black are set in positions symmetrical with respect to the crossing axis IA.

The first optical element group for synchronization 9331 includes an optical correction element 93311 and turning back mirrors 93312 to 93315.

The plurality of optical element groups 93 are respectively attached to the assembly bases 95. The assembly bases 95 include a first assembly base 951 and a second assembly base 952.

The first assembly base 951 supports the optical correction element 93311 and the turning back mirrors 93312 to 93315 of the first optical element group for synchronization 9331. Accordingly, the first optical element group for synchronization 9331 and the first assembly base 951 form a first optical element assembly 961.

The first assembly base 951 includes a first base 9511 and a second base 9512. The first base 9511 and the second base 9512 are respectively plate-like members. The optical correction element 93311 and the turning back mirror 93312 are supported by the first base 9511. The optical correction element 93311 and the turning back mirror 93312 are fixed to the first base 9511 by, for example, an adhesive. The first base 9511, the optical correction element 93311, and the turning back mirror 93312 are formed as a first subassembly 9611. A plurality of first subassemblies 9611 formed from the plurality of assembly bases 95 and the plurality of optical element groups 93 are respectively components having the same size and the same shape. The optical correction element 93311 and the turning back mirror 93312 on the first base 9511 are adjusted to transmit and reflect a ray in a predetermined direction.

The turning back mirrors 93313 to 93315 are supported by the second base 9512. The turning back mirrors 93313 to 93315 are fixed to the second base 9512 by, for example, an adhesive. The second base 9512 and the turning back mirrors 93313 and 93315 are formed as a second subassembly 9612. A plurality of second subassemblies 9612 formed from the plurality of assembly bases 95 and the plurality of optical element groups 93 are respectively components having the same size and the shame shape. The turning back mirrors 93313 to 93315 on the second base 9512 are adjusted to reflect a ray in a predetermined direction.

Accordingly, the first subassembly 9611 and the second subassembly 9612 are respectively components having different shapes. Optical components of the first subassembly 9611 and the second subassembly 9612 are adjusted in advance.

It is assumed that the first base 9511 has, for example, a rectangular shape. In this embodiment, the main body 90 includes a first fitting section 971. The first fitting section 971 has, for example, a rectangular shape and, for example, a recessed shape or is a through-hole such that the first base 9511 is fit in the first fitting section 971. Accordingly, if the first base 9511 is fit in the first fitting section 971 of the main body 90, the main body 90 and the first base 9511 are in a predetermined positional relation each other. The first base 9511 is fixed to the first fitting section 971 of the main body 90 by, for example, screws.

The first base 9511 includes a second fitting section 972. The second fitting section 972 has, for example, a rectangular shape and, for example, a recessed shape or is a through-hole. The second base 9512 has a shape fitting in the second fitting section 972. Accordingly, if the second base 9512 is fit in the second fitting section 972 of the first base 9511, the first base 9511 and the second base 9512 are in a predetermined positional relation each other. The second base 9512 is fixed to the second fitting section 972 of the first base 9511 by, for example, screws.

In a state in which the second base 9512 is fit in the first base 9511, the optical correction element 93311 and the turning back mirrors 93312 to 93315 are adjusted to reflect a ray in a predetermined direction. Accordingly, if the first base 9511 is attached to the first fitting section 971 of the main body 90 and the second base 9512 is attached to the second fitting section 972 of the first base 9511, the turning back mirrors 93312 to 93315 are in an adjusted state at relatively high accuracy. A turning back mirror group is formed by the turning back mirrors 93312 to 93315.

The optical correction element 93311 makes the beams BY and BM guided by the turning back mirrors 93312 to 93315 incident on the photodetector 941 for yellow and the photodetector 942 for magenta.

If the beams BY and BM pass an end (one end) on one side in the main scanning direction of a region SA by being deflected for scanning by the polygon mirror 92, the turning back mirror 93312 reflects the beams BY and BM and causes the beams BY and BM to travel toward the photodetector 941 for yellow and the photodetector 942 for magenta. The turning back mirror 93312 makes the beams BY and BM irradiated on one end in the main scanning direction incident on the photodetectors 941 and 942. Accordingly, the turning back mirror 93312 is provided on a side where the incident light optical system is located in the main scanning direction.

If the beams BY and BM pass an end (the other end) on the opposite side of the one side in the main scanning direction of the region SA by being deflected for scanning by the polygon mirror 92, the turning back mirror (a first turning back mirror) 93313 reflects the beams BY and BM. The turning back mirror 93313 reflects the beams BY and BM irradiated on the other end in the main scanning direction toward the opposite side of the photodetectors 941 and 942 in the main scanning direction. Accordingly, the turning back mirror 93313 is provided on the opposite side of a side where the incident light optical system is located in the main scanning direction. In this embodiment, the turning back mirror 93313 is provided near the photodetector 941 for yellow and the photodetector 942 for magenta.

The turning back mirror (a second turning back mirror) 93314 and the turning back mirror (a third turning back mirror) 93315 reflect the beams BY and BM reflected by the turning back mirror 93313 to cause the beams BY and BM to travel toward the photodetector 941 for yellow and the photodetector 942 for magenta. At this time, the turning back mirrors 93314 and 93315 are provided near the center in the main scanning direction. The turning back mirror 93314 is provided further on the outer side in the sub-scanning direction than the turning back mirror 93315. The turning back mirror 93314 reflects the beams BY and BM reflected by the turning back mirror 93313 toward the polygon mirror 92 side in the sub-scanning direction crossing the main scanning direction. The turning back mirror 93315 is provided between the turning back mirror 93312 and the optical correction element 93311. The turning back mirror 93315 reflects the beams BY and BM reflected by the turning back mirror 93314 toward the photodetectors 941 and 942 in the main scanning direction. The distance between the turning back mirrors 93314 and 93315 is set as appropriate.

If the beams BY and BM are deflected for scanning to a position (a start position) where the beams BY and BM are reflected by the turning back mirror 93312, in a (developed) state in which the beams BY and BM are not reflected by the turning back mirror 93312, the optical correction element 93311 is located in an imaginary position A. Therefore, if the beams BY and BM pass through the turning back mirror 93312, the beams BY and BM are made incident on the turning back mirror 93312 in a position where the beams BY and BM pass the outer side of the region SA. If the beams BY and BM are deflected for scanning to a position (an end position) where the beams BY and BM are reflected by the turning back mirror 93313, in a (developed) state in which the beams BY and BM are not reflected by the turning back mirror 93313, the optical correction element 93311 is located in an imaginary position B. Therefore, if the beams BY and BM pass through the turning back mirror 93313, the beams BY and BM are made incident on the turning back mirror 93313 in a position where the beams BY and BM pass the outer side of the region SA.

Like the first optical element group for synchronization 9331, the second optical element group for synchronization 9332 includes an optical correction element 93321 and turning back mirrors 93322 to 93325.

The second assembly base 952 supports the optical element correction element 93321 and the turning back mirrors 93322 to 93325 of the second optical element group for synchronization 9332. Accordingly, the second optical element group for synchronization 9332 and the second assembly base 952 form a second optical element assembly 962.

The second assembly base 952 includes a first base 9521 and a second base 9522. The first base 9521 and the second base 9522 are respectively plate-like members. The optical correction element 93321 and the turning back mirror 93322 are supported by the first base 9521. Accordingly, the first base 9521, the optical correction element 93321, and the turning back mirror 93322 are formed as a first subassembly 9621. The optical correction element 93321 and the turning back mirror 93322 on the second base 9522 are adjusted to reflect a ray in a predetermined direction.

The turning back mirrors 93323 to 93325 are supported by the second base 9522. Accordingly, the second base 9522 and the turning back mirrors 93323 to 93325 are formed as a second subassembly 9622. The turning back mirrors 93323 to 93325 on the second base 9522 are adjusted to reflect a ray in a predetermine direction.

In a state in which the second base 9522 is fit in the first base 9521, the optical correction element 93321 and the turning back mirrors 93322 to 93325 are adjusted to reflect a ray in a predetermined direction.

It is assumed that the first base 9521 has, for example, a rectangular shape. In this embodiment, a third fitting section 973 having a rectangular shape or the like is formed in the main body 90. The third fitting section 973 has, for example, a rectangular shape and, for example, a recessed shape such that the first base 9521 is fit in the third fitting section 973. Accordingly, if the first base 9521 is fit in the third fitting section 973 of the main body 90, the main body 90 and the first base 9521 are in a predetermined positional relation each other.

In the first base 9521, a fourth fitting section 974 having a rectangular shape or the like is formed. The fourth fitting section 974 is formed in, for example, a rectangular shape and a recessed shape or as a through-hole. The second base 9522 has a shape fitting in the fourth fitting section 974. Accordingly, if the second base 9522 is fit in the fourth fitting section 974 of the first base 9521, the first base 9521 and the second base 9522 are in a predetermined positional relation each other.

A turning back mirror group is formed by the turning back mirrors 93322 to 93325. The direction of the turning back mirror 93322 is adjusted in advance on the first base 9521. The directions of the turning back mirrors 93323 to 93325 are adjusted in advance on the second base 9522. Accordingly, if the first base 9521 is attached to the third fitting section 973 of the main body 90 and the second base 9522 is attached to the fourth fitting section 974 of the first base 9521, the turning back mirrors 93322 to 93325 are in an adjusted state at relatively high accuracy. A manufacturing operator of the optical scanning device 43 adjust the turning back mirrors 93322 to 93325 to a desired state according to necessity in a work process.

The optical correction element 93321 makes the beams BC and BK guided by the turning back mirrors 93322 to 93325 incident on the photodetector 943 for cyan and the photodetector 944 for black. If the beams BC and BK pass an end (one end) on one side in the main scanning direction of a region SB by being deflected for scanning by the polygon mirror 92, the turning back mirror 93322 reflects the beams BC and BK and causes the beams BC and BK to travel toward the photodetector 943 for cyan or the photodetector 944 for black. Accordingly, the turning back mirror 93322 is provided on a side where the incident light optical system is located in the main scanning direction.

If the beams BC and BK pass an end (the other end) on the opposite side of the one side in the main scanning direction of the region SB by being deflected for scanning by the polygon mirror 92, the turning back mirror (a first turning back mirror) 93323 reflects the beams BC and BK. Accordingly, the turning back mirror 93323 is provided on the opposite side of a side where the incident light optical system is located in the main scanning direction. In this embodiment, the turning back mirror 93323 is provided near the photodetector 943 for cyan and the photodetector 944 for black. The turning back mirror (a second turning back mirror) 93324 and the turning back mirror (a third turning back mirror) 93325 reflect the beams BC and BK reflected by the turning back mirror 93323 to cause the beams BC and BK to travel toward the photodetector 943 for cyan or the photodetector 944 for black. At this time, the turning back mirrors 93324 and 93325 are provided near the center in the main scanning direction. The turning back mirror 93324 is provided further on the outer side in the sub-scanning direction than the turning back mirror 93325. The turning back mirror 93325 is provided between the turning back mirror 93322 and the optical correction element 93321. The distance between the turning back mirrors 93324 and 93325 is set as appropriate.

If the beams BC and BK are deflected for scanning to a position (a start position) where the beams BC and BK are reflected by the turning back mirror 93322, in a (developed) state in which the beams BC and BK are not reflected by the turning back mirror 93322, the optical correction element 93321 is located in an imaginary position C. Therefore, if the beams BC and BK pass through the turning back mirror 93322, the beams BC and BK are made incident on the turning back mirror 93322 in a position where the beams BC and BK pass the outer side of the region SB. If the beams BC and BK are deflected for scanning to a position (an end position) where the beams BC and BK are reflected by the turning back mirror 93323, in a (developed) state in which the beams BC and BK are not reflected by the turning back mirror 93323, the optical correction element 93321 is located in an imaginary position D. Therefore, if the beams BC and BK pass through the turning back mirror 93323, the beams BC and BK are made incident on the turning back mirror 93323 in a position where the beams BC and BK pass the outer side of the region SB.

The first subassembly 9611 of the first optical element group for synchronization 9331 and the first subassembly 9621 of the second optical element group for synchronization 9332 have the same size and the same shape. The second subassembly 9612 of the first optical element group for synchronization 9331 and the second subassembly 9622 of the second optical element group for synchronization 9332 have the same size and the same shape.

The second optical element group for synchronization 9332 is disposed in a position point symmetrical or substantially point symmetrical to the first optical element group for synchronization 9331 centering on the predetermined axis of symmetry S of the polygon mirror 92. That is, the optical element assemblies 961 and 962 are parallel to the rotation axis C of the polygon mirror 92 and rotationally symmetrical with respect to the axis of symmetry S crossing the crossing axis IA parallel to a main scanning direction axis.

Assembly work for the first optical element group for synchronization 9331 and the second optical element group for synchronization 9332 to the main body 90 of the optical scanning device 43 is explained.

Work for forming the first subassemblies 9611 and 9621 and the second subassemblies 9612 and 9622 and work for forming the first optical element assembly 961 and the second optical element assembly 962 are referred to as work of a subline. Work for assembling the image forming apparatus 1 including work for attaching the first optical element assembly 961 and the second optical element assembly 962 to the main body 90 of the optical scanning device 43 is referred to as work of a mainline.

As the work of the subline, an operator disposes the optical correction element 93311 and the turning back mirror 93312 on the first base 9511. The operator adjusts the optical correction element 93311 and the turning back mirror 93312 to reflect a ray in a predetermined direction and forms the first subassembly 9611. At this time, since components are common to the first subassemblies 9611 and 9621, it is unnecessary to separately manufacture the first subassemblies 9611 and 9621.

As the work of the subline, the operator disposes the turning back mirrors 93313 to 93315 on the second base 9512. The operator adjusts the turning back mirrors 93313 to 93315 to reflect a ray in a predetermined direction and forms the second subassembly 9612. At this time, since components are common to the second subassemblies 9612 and 9622, it is unnecessary to separately manufacture the second subassemblies 9612 and 9622.

The operator in the subline manufactures the first optical element subassembly 961 from the first subassembly 9611 and the second subassembly 9612 and manufactures the second optical element assembly 962 from the first subassembly 9621 and the second subassembly 9622. At this time, since components are common to the first and second optical element assemblies 961 and 962, it is unnecessary to separately manufacture the first and second optical element assemblies 961 and 962.

The operator in the subline adjusts the turning back mirrors 93312 to 93315 and the optical correction element 93311 of the first optical element assembly 961. That is, the operator in the subline adjusts the turning back mirrors 93322 to 93325 and the optical correction element 93321 of the second optical element assembly 962.

As the work of the mainline, the operator attaches and provisionally fixes the first optical element assembly 961 to the first fitting section 971 of the main body 90 and attaches and provisionally fixes the second optical element assembly 962 to the third fitting section 973.

The operator in the mainline adjusts the first optical element assembly 961 according to necessity. The operator makes beams BYs and BMs (indicated by broken lines in FIGS. 6 and 7) incident on the photodetector 941 for yellow and the photodetector 942 for magenta and makes a beam BYe (indicated by an alternate long and short dash line in FIGS. 6 and 7) incident on the photodetector 941 for yellow. Similarly, the operator in the mainline adjusts the second optical element assembly 962 according to necessity. The operator makes beams BCs and BKs incident on the photodetector 943 for cyan and the photodetector 944 for black and makes a beam BKe (indicated by an alternate long and short dash line in FIGS. 6 and 7) incident on the photodetector 944 for black.

Accordingly, the operator in the mainline checks the directions of the turning back mirrors 93312 to 93315 of the first optical element assembly 961, adjusts the directions according to necessity, reflects the beam BYe (indicated by the alternate long and short dash line in FIGS. 6 and 7) with the turning back mirrors 93313 to 93315, and makes the beam BYe incident on the photodetector 941 for yellow. Similarly, the operator in the mainline checks the directions of the turning back mirrors 93322 to 93325 of the second optical element assembly 962, adjusts the directions according to necessity, reflects the beam BKe (indicated by the alternate long and short dash line in FIGS. 6 and 7) with the turning back mirrors 93323 to 93325, and makes the beam BKe incident on the photodetector 944 for black. In this state, the operator fixes the first optical element assembly 961 to the first fitting section 971 of the main body 90 with screwing or the like and fixes the second optical element assembly 962 to the third fitting section 973 of the main body 90 with screwing or the like.

Figure 6:
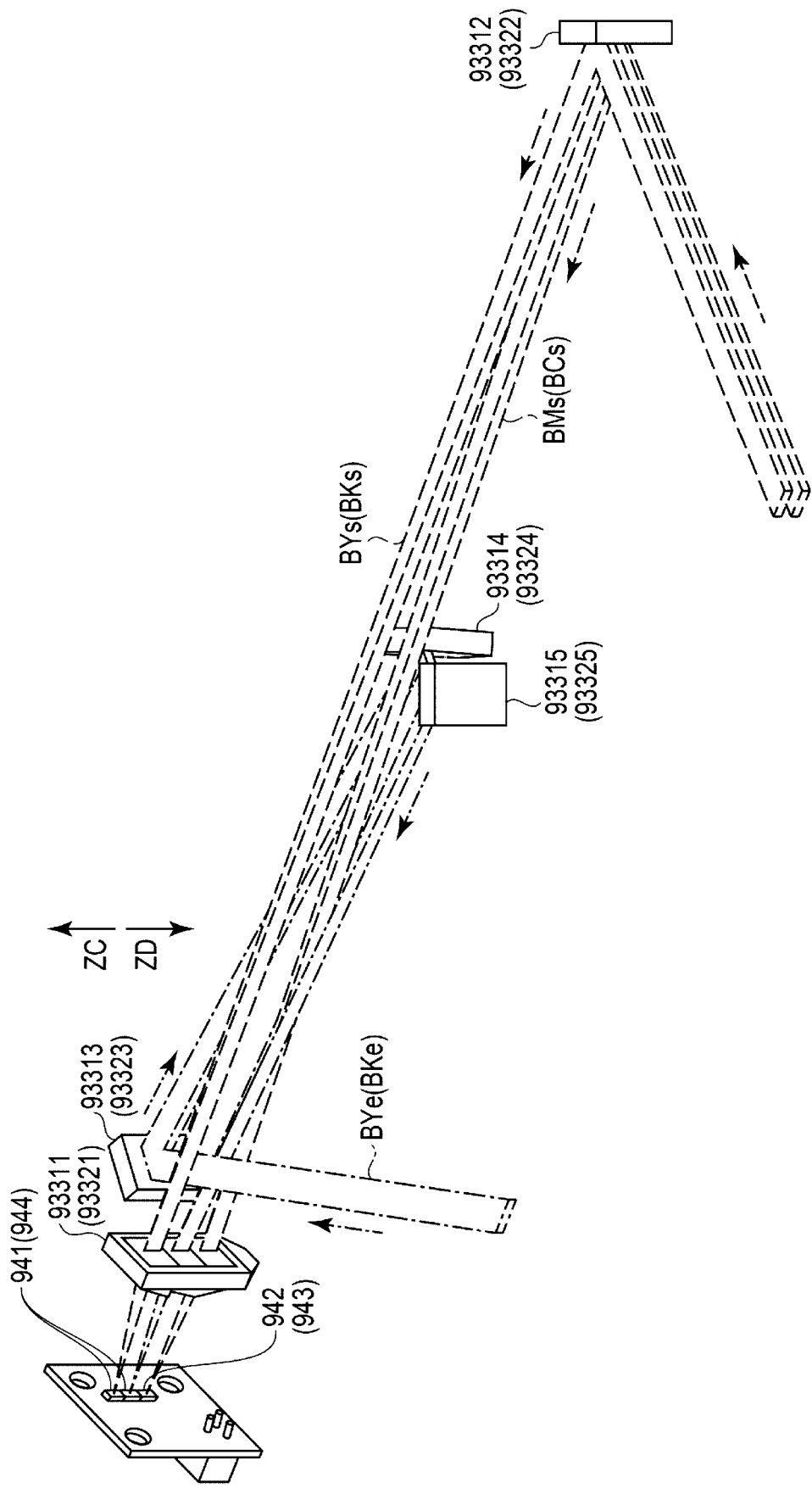
FIG. 6 is a schematic perspective view of an optical system for synchronization provided in the optical scanning device viewed from the upper side in the height direction.
Figure 7:
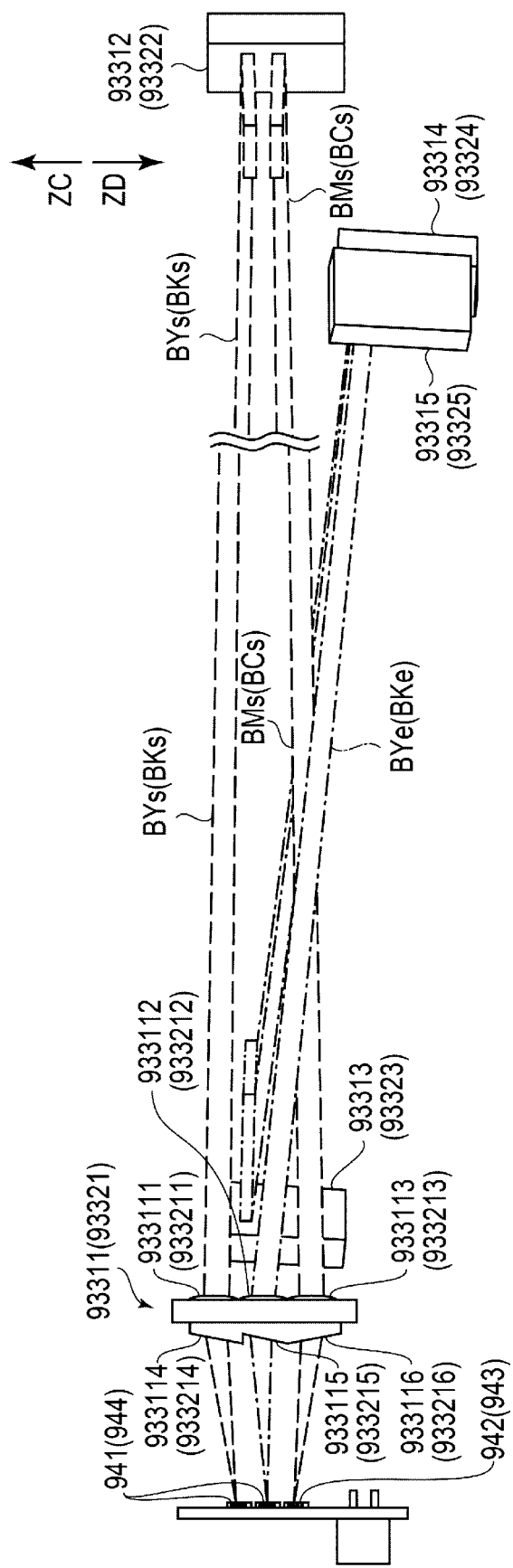
FIG. 7 is a schematic diagram of a positional relation, viewed from one side in a sub-scanning direction, in which beams irradiated on a start position or an end position of deflection scanning are made incident on the optical system for synchronization provided in the optical scanning device.

A route of beams in the optical system for synchronization is explained. FIGS. 6 and 7 are schematic diagrams illustrating a route of beams in the optical system for synchronization concerning yellow and magenta. In FIGS. 6 and 7, as in FIGS. 2 and 3, the height direction, the first direction, and the second direction are defined. FIG. 6 is a schematic perspective view of the route of the beams of the optical system for synchronization concerning yellow and magenta viewed from the upper side in the height direction. FIG. 7 is a schematic diagram of the route of the beams of the optical system for synchronization concerning yellow and magenta viewed from the polygon mirror 92 side (a side indicated by the arrow XD) in the sub-scanning direction.

As explained above, in the optical scanning device 43, the beams BY and BM are deflected for scanning to the arrow YD side along the main scanning direction by the polygon mirror 92. In the deflection scanning by the polygon mirror 92, in a position (a start position) where the beams BY and BM are reflected by the turning back mirror 93312, the beams BYs and BMs (indicated by the broken lines) are reflected by the turning back mirror 93312 and made incident on the photodetector 941 for yellow and the photodetector 942 for magenta. Thereafter, if the deflection scanning by the polygon mirror 92 is continued and the beam BY is deflected for scanning to a position (an end position) where the beam BY is reflected by the turning back mirror 93313, the beam BYe (indicated by the alternate long and short dash line) is reflected by the turning back mirrors 93313 to 93315 and made incident on the photodetector 941 for yellow. Therefore, the photodetector 941 for yellow and the photodetector 942 for magenta respectively detect the beams BYs and BMs in the start position of the deflection scanning and the photodetector 941 for yellow detects the beam BYe in the end position of the deflection scanning.

Figure 8:
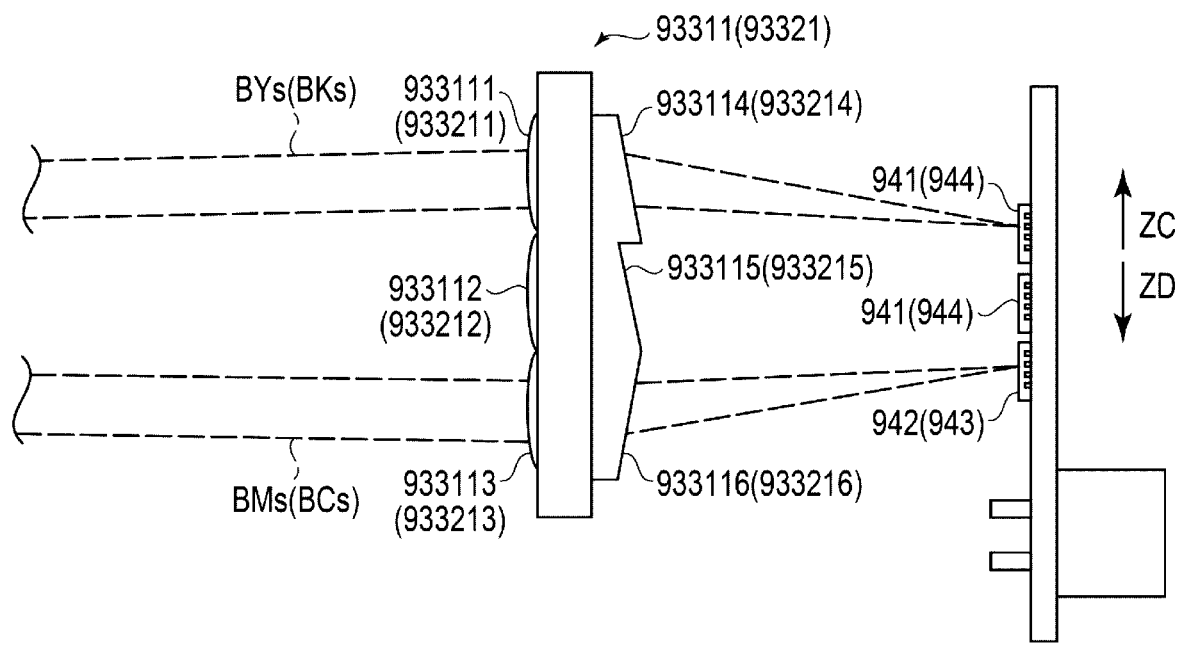
FIG. 8 is a schematic diagram of a positional relation, viewed from the one side in the main scanning direction, in which the beams in the start position are made incident on an optical correction element and a photodetector provided in the optical scanning device.
Figure 9:
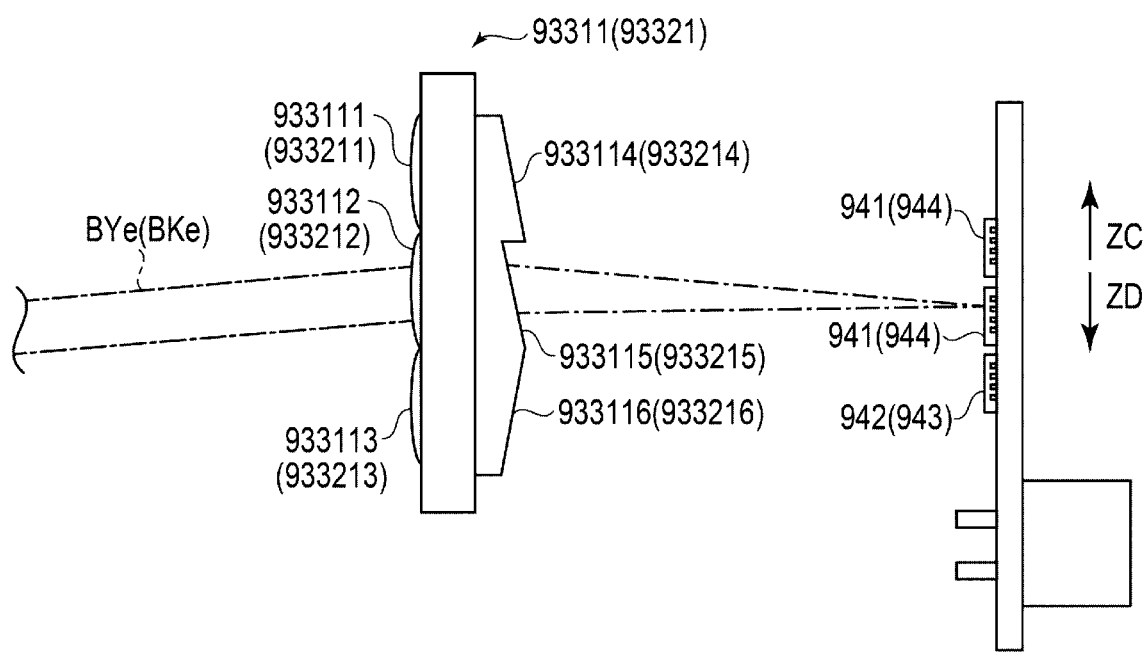
FIG. 9 is a schematic diagram of a positional relation, viewed from the one side in the main scanning direction, in which beams irradiated on the end position of the deflection scanning are made incident on the optical correction element and the photodetector provided in the optical scanning device.

FIG. 8 illustrates a positional relation in which the beams BYs and BMs are respectively made incident on the photodetector 941 for yellow and the photodetector 942 for magenta in the start position of the deflection scanning by the polygon mirror 92. FIG. 9 illustrates a positional relation in which the beam Bye is made incident on the photodetector 941 for yellow in the end position of the deflection scanning by the polygon mirror 92. In FIGS. 8 and 9, as in FIGS. 2 and 3, the height direction, the first direction, and the second direction are defined.

As illustrated in FIGS. 8 and 9, in the optical scanning device 43, the photodetector 941 for yellow and the photodetector 942 for magenta are disposed side by side in the height direction. In order to respectively detect the beams BYs and BMs in the start position of the deflection scanning and the beam BYe in the end position of the deflection scanning, two photodetectors 941 for yellow and one photodetector 942 for magenta are mounted on, for example, the same substrate. In an example illustrated in FIGS. 8 and 9, the photodetector 941 for yellow that detects the beam BYs in the start position of the deflection scanning, the photodetector 941 for yellow that detects the beam BYe in the end position of the deflection scanning, and the photodetector 942 for magenta that detects the beam BMs in the start position of the deflection scanning are mounted on the same substrate in order from the upper side in the height direction.

As illustrated in FIGS. 8 and 9, the optical correction element 93311 includes cylindrical surfaces 933111 to 933113 and prism surfaces 933114 to 933116. In the optical correction element 93311, the cylindrical surfaces 933111 to 933113 are opposed to the prism surfaces 933114 to 933116. The optical correction element 93311 is provided in a posture in which the prism surfaces 933114 to 933116 face the photodetector 941 for yellow and the photodetector 942 for magenta. At this time, as illustrated in FIG. 7, the cylindrical surfaces 933111 to 933113 face the turning back mirror 93312 side in the main scanning direction.

The cylindrical surfaces 933111 to 933113 converge beams incident thereon in one direction of cross sections crossing a traveling direction of the beams. In this embodiment, each of the cylindrical surfaces 933111 to 933113 is extended along the sub-scanning direction and is formed in a convex shape toward the turning back mirror 93312 side in the main scanning direction. Each of the cylindrical surfaces 933111 to 933113 functions as, for example, a cylindrical lens. Therefore, if the beams pass through the cylindrical surfaces 933111 to 933113, the cylindrical surfaces 933111 to 933113 converge the beams in the sub-scanning direction. The prism surfaces 933114 to 933116 are formed in a plane shape facing predetermined direction and refract beams incident thereon to change a traveling direction of the beams.

Figure 10:
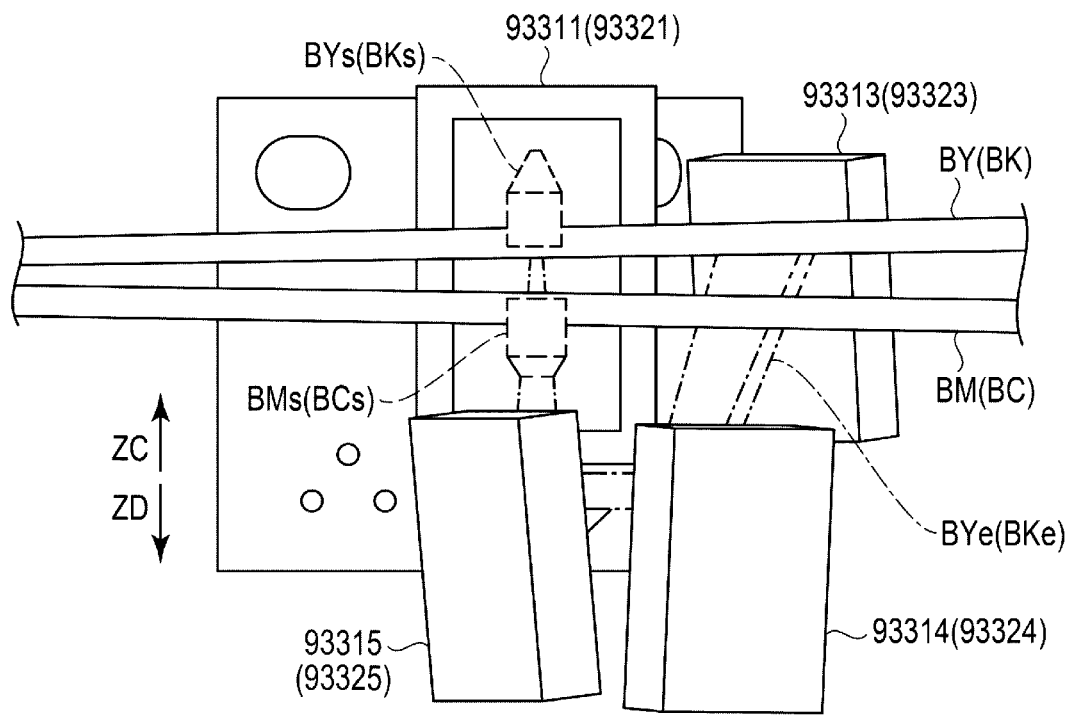
FIG. 10 is a schematic diagram of the positional relation of the optical system for synchronization illustrated in FIG. 7 viewed from the one side in the main scanning direction.

FIG. 10 is a schematic diagram of the optical correction element 93311 illustrated in FIGS. 6 and 7 viewed from the turning back mirror 93312 side in the main scanning direction. As illustrated in FIG. 10, the beam BYe is reflected toward the lower side in the height direction by the turning back mirror 93313 and reflected toward the upper side in the height direction by the turning back mirrors 93314 and 93315. Consequently, the beam BYe is guided to the cylindrical surface 933112 of the optical correction element 93311 without crossing the beams BY and BM passing the region SA. An optical path difference from the beams BYs and BMs caused by guiding the beam BYe as explained above is corrected by adjusting the prism surface 933115. Therefore, a difference between an optical path length of the beams BYs and BMs and an optical path length of the beam BYe is substantially absent.

With such a configuration, in the optical system for synchronization concerning yellow and magenta, the beam BYs is reflected once by the turning back mirror 93312 and made incident on the cylindrical surface 933111 and passes through the prism surface 933114 to be made incident on the photodetector 941 for yellow disposed on the uppermost side in the height direction and converge on a detection surface of the photodetector 941 for yellow. Similarly, the beam BMs is reflected once by the turning back mirror 93312 and made incident on the cylindrical surface 933113 and passes through the prism surface 933116 to be made incident on the photodetector 942 for magenta disposed on the lowermost side in the height direction and converge on a detection surface of the photodetector 942 for magenta. The beam BYe is reflected three times by the turning back mirrors 93313 to 93315 and made incident on the cylindrical surface 933112 and passes through the prism surface 933115 to be made incident on the photodetector 941 for yellow disposed between the photodetector 941 for yellow and the photodetector 942 for magenta in the height direction and converge on a detection surface of the photodetector 941 for yellow. In this way, the detection surfaces of the photodetectors 941 and 942 are focal points. In this case, all of the beams BYs, BMs, and BYe are reflected odd number times to be made incident on the photodetectors 94 corresponding thereto. The numbers of times of reflection of the beams BYs, BMs, and BYe are not limited to this. However, all of the numbers of times of reflection are preferably odd numbers or even numbers.

In this case, as illustrated in FIG. 3, if the optical system for synchronization concerning yellow and magenta is viewed from one side in the height direction, a track of the beam BYs, a track of the beam BMs, and a track of the beam BYe overlap between the turning back mirror 93312 and the optical correction element 93311. As illustrated in FIG. 7, the track of the beam BMs moves to the lower side in the height direction toward the optical correction element 93311. On the other hand, the track of the beam BYe moves to the upper side in the height direction from the turning back mirror 93315 toward the optical correction element 93311. Accordingly, the track of the beam BMs crosses the track of the beam BYe in a predetermined position.

The optical system for synchronization concerning cyan and black has the same configuration as the configuration of the optical system for synchronization concerning yellow and magenta. Accordingly, the optical correction element 93321 includes cylindrical surfaces 933211 to 933213 and prism surfaces 933214 to 933216. As in the optical system for synchronization concerning yellow and magenta, the beams BC and BK are guided. Therefore, the photodetector 943 for cyan and the photodetector 944 for black respectively detect the beams BCs and BKs in the start position of the deflection scanning and the photodetector 944 for black detects the beam BKe in the end position of the deflection scanning. As explained above, the optical system for synchronization concerning cyan and black are provided in the position point symmetrical or substantially point symmetrical to the optical system for synchronization concerning yellow and magenta centering on the axis of symmetry S of the polygon mirror 92 and is deflected for scanning to the arrow YC side in the main scanning direction. Accordingly, the beams BCs, BKs, and BKe are made incident on the photodetector 943 for cyan or the photodetector 944 for black from the arrow YD side in the main scanning direction.

In such an optical scanning device 43, an image writing start time can be detected by detecting, with the photodetector 941, the beam BYs irradiated on one end in the main scanning direction serving as an image writing start position and detecting, with the photodetector 942, the beam BMs irradiated on the one end in the main scanning direction serving as the image writing start position in the first optical element group for synchronization 9331. An image writing end time can be detected by detecting, with the photodetector 941, the beam BYe irradiated on the other end in the main scanning direction serving as an image writing end position. The image forming apparatus 1 can calculate a time for image writing start relating to yellow and magenta based on results of the detections.

Similarly, an image writing start time can be detected by detecting, with the photodetector 944, the beam BKs irradiated on one end in the main scanning direction serving as an image writing start position and detecting, with the photodetector 943, the beam BCs irradiated on the one end in the main scanning direction serving as the image writing start position in the second optical element group for synchronization 9332. An image writing end time can be detected by detecting, with the photodetector 944, the beam BKe irradiated on the other end in the main scanning direction serving as an image writing end position. The image forming apparatus 1 can calculate a time for image writing start relating to cyan and black based on results of the detections.

The image forming apparatus 1 can predict a degree of deviation of formed images by comparing the time of the image writing start relating to yellow and magenta and the time of the image writing start relating to cyan and black. In an example, the image forming apparatus 1 adjusts, based on the degree of the deviation of the images, timings of beams respectively emitted from a plurality of incident light optical systems to synchronize the plurality of incident light optical systems. In another example, the image forming apparatus 1 adjusts, based on the degree of the deviation of the images, timing of conveyance of a recording medium and conveying speed of the recording medium in the image forming unit 19.

At this time, as illustrated in FIGS. 8 and 9, the photodetectors 941 and 942 (the photodetectors 943 and 944) are disposed side by side in the height direction. Accordingly, in an example, even if the positions of the photodetectors change because the optical scanning device 43 thermally expands (the optical scanning device 43 changes at equal magnification to a temperature change), since the photodetectors 941 and 942 (the photodetectors 943 and 944) move in the same manner, the time from the image writing start to the image writing end does not substantially change. In another example, even if the optical path lengths in the optical systems for synchronization change because the optical scanning device 43 thermally expands, the time from the image writing start to the image writing end substantially does not change. Accordingly, it is possible to measure a change in the time from the image writing start to the image writing end because of a cause other than fluctuation in the positions of the photodetectors. Examples of such a cause include curvature fluctuation due to, for example, a temperature change of the fθ lenses and wavelength fluctuation of the laser diodes.

As explained above, in the optical scanning device 43 in this embodiment, the beam irradiated on the end (one end) on one side in the main scanning direction is made incident on the photodetector 94 from the side where the beam irradiated on the other end on the opposite side of the one end in the main scanning direction is made incident on the photodetector 94. That is, the beam made incident on the one end in the main scanning direction is made incident on the photodetector 94 from the same side as the beam irradiated on the other end in the main scanning direction. Accordingly, it is possible to suppress a detection error due to a difference in a direction of incidence on the photodetector 94.

If the optical scanning device 43 in this embodiment is viewed from one direction in the height direction, a track on which the beam irradiated on the one end in the main scanning direction travels to the photodetector 94 preferably includes a portion overlapping a track on which the beam irradiated on the other end in the main scanning direction travels to the photodetector 94. By adjusting the tracks of the beams in this way, for example, it is possible to make the track of the beam irradiated on the one end in the main scanning direction parallel or substantially parallel to the track of the beam irradiated on the other end. Consequently, the optical scanning device 43 can appropriately detect the beams.

In the optical scanning device 43 in this embodiment, it is preferable that the beam irradiated on the end position (the other end) in the main scanning direction is condensed at a focal point of the beam irradiated on the start position (the one end). It is preferable that the photodetector 94 is provided at the focal point and detects both of the beam irradiated on the one end in the main scanning direction and the beam irradiated on the other end. If the photodetector 94 is disposed in this way, it is possible to appropriately detect the beams as explained above even if a detection position fluctuates because of thermal expansion or the like.

In the optical scanning device 43 in this embodiment, it is preferable that the optical element group 93 is provided to deviate in the height direction from an image region where beams are deflected for scanning. Consequently, the optical element group 93 does not interfere with the beams passing the image region. The optical element group 93 can be compactly provided in the optical scanning device 43. Consequently, the optical scanning device 43 can appropriately detect the beams.

In the optical scanning device 43 in this embodiment, it is preferable that the optical element group 93 includes the plurality of turning back mirrors 93312 to 93315 that reflect the beams and guide the beams to the photodetector 94. The number of times the beams irradiated on the one end in the main scanning direction are reflected by the plurality of turning back mirrors is the same even number of times or odd number of times as the number of times the beams irradiated on the other end in the main scanning direction are reflected by the plurality of turning back mirrors. By adjusting the number of times of reflection in this way, even if an image is reversed by the reflection of the plurality of turning back mirrors, it is possible to match a direction of an image of the beams irradiated on the one end in the main scanning direction and a direction of an image of the beams irradiated on the other end.

In the optical scanning device 43 in this embodiment, the turning back mirrors 93313 to 93315 (93323 to 93325) that reflect the beams irradiated on the other end in the main scanning direction are provided in positions close to one another in the sub-scanning direction. By disposing the turning back mirrors 93313 to 93315 (93323 to 93325) in this way, it is possible to suppress influence on detection of beams by thermal expansion (linear expansion) of the optical scanning device 43 in the sub-scanning direction.

In the optical scanning device 43 in this embodiment, it is preferable that the beams irradiated on the end position (the other end) in the main scanning direction deviate to one side in the height direction toward the photodetector 94 after being reflected by the turning back mirror 93313 (93323). Consequently, the beams do not interfere with the beams passing the image region. The optical element group 93 can be compactly provided in the optical scanning device 43. Consequently, the optical scanning device 43 can appropriately detect the beams.

According to this embodiment, complicated mirror adjustment of the turning back mirrors 93312 to 93315 of the first optical element assembly 961 and the turning back mirrors 93322 to 93325 of the second optical element assembly 962 can be performed in the subline of the image forming apparatus 1 rather than being performed in the mainline of the image forming apparatus 1. Accordingly, the operator in the mainline can reduce a time consumed for optical adjustment of the image forming apparatus 1. Therefore, stagnation of a manufacturing process of the image forming apparatus 1 is suppressed from being caused by the optical adjustment in the mainline.

In this embodiment, the first optical element group for synchronization 9331 of the optical scanning device 43 includes the turning back mirrors 93312 to 93315 and the second optical element group for synchronization 9332 of the optical scanning device 43 includes the turning back mirrors 93322 to 93325. If the turning back mirrors 93312 to 93315 and 93322 to 93325 are directly disposed in the main body 90 of the optical scanning device 43, adjustment of the mirrors needs to be performed by the number of turning back mirrors 93312 to 93315 and 93322 to 93325 and assembly manhour is large. Since the turning back mirrors 93312 to 93315 and 93322 to 93325 turn back a ray a plurality of times, highly accurate positioning is requested. In this way, if the turning back mirrors 93312 to 93315 and 93322 to 93325 are directly disposed in the main body 90 of the optical scanning device 43, assembly manhour of the mainline in the manufacturing of the optical scanning device 43 increases and is likely to affect an assembly time.

In this embodiment, the operator in the subline manufactures the first optical element assembly 961 and the second optical element assembly 962, which are the same components, and performs optical adjustment in advance. In the optical scanning device 43 according to this embodiment, in the mainline of the manufacturing of the optical scanning device 43, the first optical element assembly 961 and the second optical assembly 962 only have to be assembled to the main body 90. It is possible to reduce manhour in the mainline and reduce an optical adjustment time.

A process in which the operator in the subline performs optical adjustment of the first optical element assembly 961 and the second optical element assembly 962 less easily affect stagnation of the optical scanning device 43 in the mainline. Accordingly, if the operator achieves optical accuracy of the first optical element assembly 961 and the second optical element assembly 962 in the subline, it is possible to guarantee optical accuracy of the turning back mirrors 93312 to 93315 and 93322 to 93325 at relatively high accuracy if the first optical element assembly 961 and the second optical element assembly 962 are attached to the main body 90 in the mainline.

For example, it is assumed that the first subassemblies 9611 and 9621 are different components and the second subassemblies 9612 and 9622 are different components. In this case, the operator in the subline needs to attach a predetermined subassembly 9612 to a predetermined first subassembly 9611. The operator in the subline needs to attach a predetermined second subassembly 9622 to a predetermined first subassembly 9621. In this case, for example, if the operator in the subline attaches the second subassembly 9622 to the first subassembly 9611, the operator does the work again. Accordingly, work for the operator in the subline to attach the predetermined second subassembly 9612 to the predetermined first subassembly 9611 and attach the predetermined second subassembly 9622 to the predetermined first subassembly 9621 is requested. The optical scanning device 43 according to this embodiment is rotationally symmetrical with respect to the axis of symmetry S on the polygon mirror 92. Accordingly, the optical scanning device 43 according to this embodiment realizes commonization of a part of components. Specifically, the first subassemblies 9611 and 9621 are the same components and the second subassemblies 9612 and 9622 are the same components. That is, the operator in the subline does not need to separately manufacture the first optical element assembly 961 and the second optical element assembly 962. Accordingly, the operator in the subline can manufacture the first optical element assembly 961 and the second optical element assembly 962 at lower cost. The operator in the mainline can reduce manhour for attaching optical components to the optical scanning device 43 and reduce a work time of optical adjustment. Accordingly, the operator in the mainline can manufacture the optical scanning device 43 and the image forming apparatus 1 including the optical scanning device 43 at lower cost.

In this embodiment, it is explained that the first and second optical element assemblies 961 and 962 are rotationally symmetrical with respect to the axis of symmetry S. The turning back mirrors 93312 to 93315 of the first optical element assembly 961 and the turning back mirrors 93322 to 93325 of the second optical element assembly 962 may not be accurately in a rotationally symmetrical relation with respect to the axis of symmetry S. The optical correction element 93311 of the first optical element assembly 961 and the optical correction element 93321 of the second optical element assembly 962 may not be accurately in a rotationally symmetrical relation with respect to the axis of symmetry S. Accordingly, the beams BY, BM, BC, and BK may translate in a direction in which the beams BY, BM, BC, and BK do not optically have power. For example, in the optical correction element 93311, incident positions of the beams BY, BM, BC, and BK may deviate in the vertical direction with respect to the paper surface in FIG. 7.

If the image writing end is set as, for example, a time from the image writing start, the optical scanning device 43 may not detect the beams BYe and BKe with the photodetector 94. In the optical scanning device 43, in this case, when the optical scanning device 43 is manufactured, the second subassembly 9612 only has to be not attached to the first subassembly 9611 of the optical scanning device 43.

In this embodiment, an example is explained in which the operator in the mainline fixes the first and second optical element assemblies 961 and 962 assembled by the operator in the subline to the main body 90. The operator in the mainline may fix the first subassemblies 9611 and 9621 assembled by the operator in the subline to the main body 90 and, thereafter, fix the second subassemblies 9612 and 9622 assembled by the operator in the subline in predetermined positions of the first subassemblies 9611 and 9621.

As explained above, according to this embodiment, it is possible to provide the optical scanning device 43 and the image forming apparatus 1 including the optical scanning device 43 that simplify assembly in an assembly line.

(Modifications)

Figure 11:
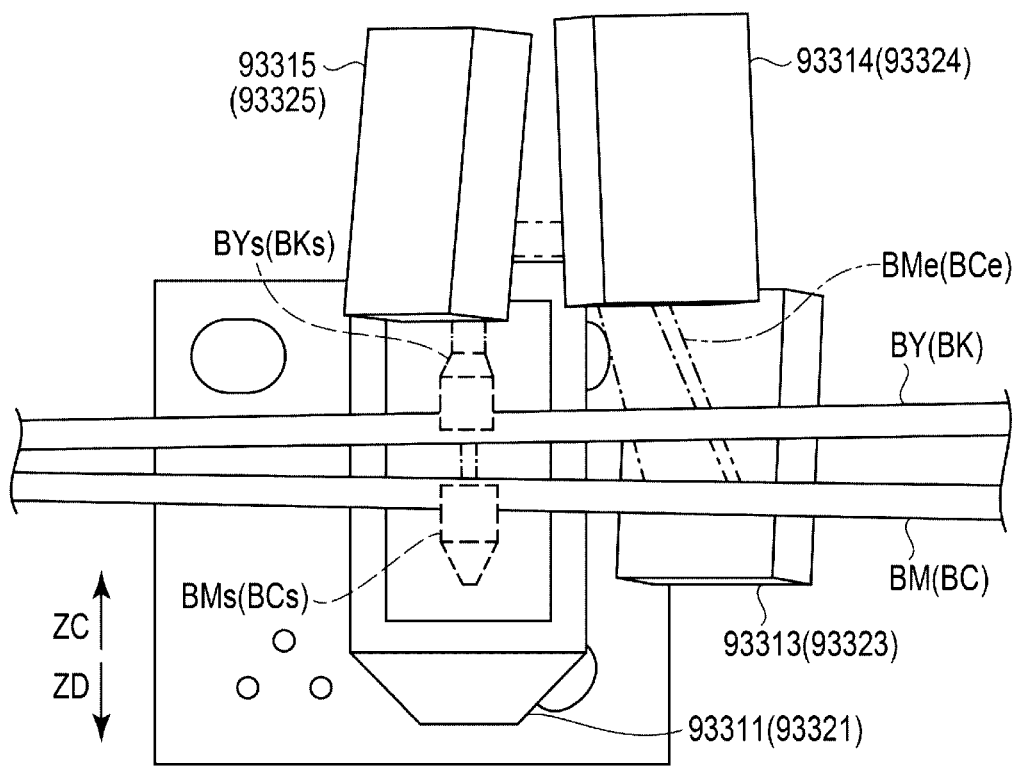
FIG. 11 is a schematic diagram of a positional relation of the optical system for synchronization different from the positional relation illustrated in FIG. 10 viewed from the one side in the main scanning direction.

In a certain modification, the disposition of the turning back mirrors 93313 to 93315 (93323 to 93325) may be different. FIG. 11 is a schematic diagram of a positional relation of the optical system for synchronization in disposition different from the disposition illustrated in FIG. 10 viewed from the one side in the main scanning direction. In this example, a beam BMe (BCe) is reflected toward the upper side in the height direction by the turning back mirror 93313 (93323) and is reflected toward the lower side in the height direction by the turning back mirrors 93314 and 93315 (93324 and 93325). Consequently, the beam BMe (BCe) is guided to the cylindrical surface 933112 (933212) of the optical correction element 93311 without crossing the beams BY and BM (BK and BC) passing the region SA.

In a certain modification, the beams irradiated on the start position of the deflection scanning may be reflected three times and detected by the photodetector 94 and the beams irradiated on the end position of the deflection scanning may be reflected once and detected by the photodetector 94. That is, a configuration until the beams irradiated on the end position of the deflection scanning are guided to the photodetector corresponding to the beams in the embodiment may be used as a configuration until the beams irradiated on the start position of the deflection scanning are guided to the photodetector corresponding to the beams in this modification. In this case, a configuration until the beams irradiated on the start position of the deflection scanning are guided to the photodetector corresponding to the beams in the embodiment is used as a configuration until the beams irradiated on the end position of the deflection scanning are guided to the photodetector corresponding to the beams in this modification.

In a certain modification, all of the beams BYs, BYe, and BMs may be detected by a single photodetector 94 and all of the beams BKs, BKe, and BCs may be detected by the single photodetector 94. By detecting all of the beams BYs, BYe, and BMs with the single photodetector 94 in this way, it is possible to further suppress a detection error due to the separate disposition of the photodetectors 94.

In a certain modification, both of the beams BYs and BMs (BKs and BCs) irradiated on the start position of the deflection scanning may not be detected and one of the beams may be detected. In this case, the photodetector 94 may monitor a time from the image writing start to the image writing end by, for example, detecting the beam BYs and the beam BYe. An image writing start position of the beam BY is determined based on, for example, a color shift correction amount measured by a predetermined method in advance. In a certain modification, in addition to the beams BYs, BYe, and BMs (BCs, BCe, and BKs), the beam BMe (BKe) may be detected by the photodetector 94. In this case, both of an image writing start time and an image writing end time are detected by two kinds of beams BY and BM (BC and BK).

Even if the disposition of the turning back mirrors 93313 to 93315 (93323 to 93325) is different from the example illustrated in FIG. 10 in the first embodiment, it is possible to form the first optical element assembly 961 by causing the second base 9512 to support the turning back mirrors 93313 to 93315 as appropriate. The second optical element assembly 962 rotationally symmetrical to the first optical element assembly 961 with respect to the axis of symmetry S can also be manufactured in the same manner as the first optical element assembly 961.

According to this modification as well, it is possible to provide the optical scanning device 43 and the image forming apparatus 1 including the optical scanning device 43 that simplify assembly in an assembly line.

Second Embodiment

The image forming apparatus 1 according to a second embodiment is explained with reference to FIGS. 12 and 13. This embodiment is a modification of the first embodiment. The same members as the members explained in the first embodiment or members having the same functions as the functions of the members explained in the first embodiment are denoted by the same reference numerals and signs and detailed explanation of the members is omitted.

Figure 12:
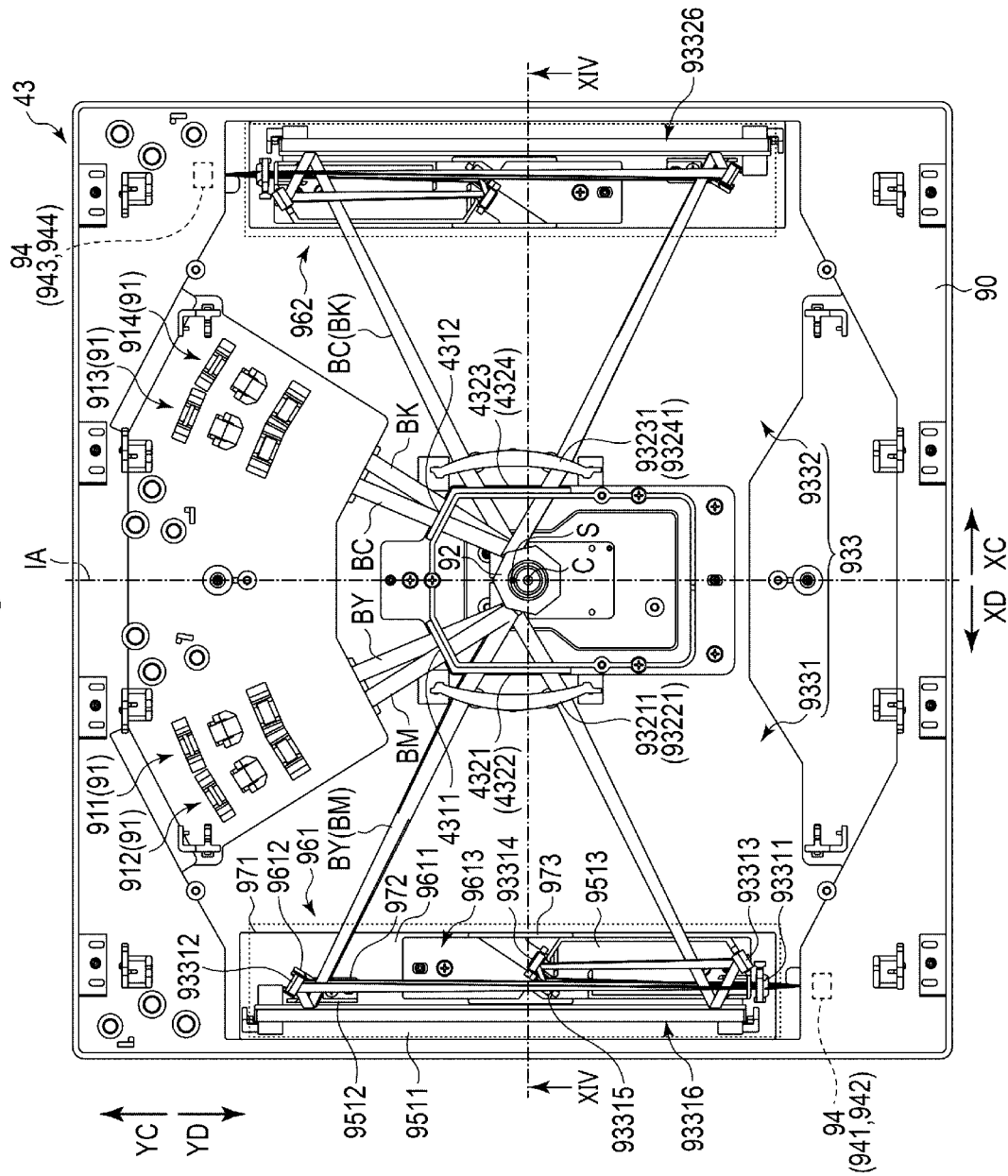
FIG. 12 is a schematic diagram of the optical scanning device according to the second embodiment viewed from the upper side in the height direction.

FIG. 12 is a schematic diagram of the optical scanning device 43 of the image forming apparatus 1 viewed from the upper side in the height direction. As illustrated in FIG. 12, in this embodiment, the optical scanning device 43 includes a first slender mirror (a common turning back mirror) 93316 and a second slender mirror (a common turning back mirror) 93326.

In the first slender mirror 93316, the turning back mirrors 93213 and 93223 explained in the first embodiment are not used. Instead, the turning back mirrors 93213 and 93223 are communized. The first slender mirror 93316 is present further on the arrow XD side in the sub-scanning direction than the optical correction element 93311 and the turning back mirrors 93312 to 93315. The first slender mirror 93316 is long in a direction along the arrow YC side and the arrow YD side in the main scanning direction and includes a reflection surface facing the polygon mirror 92 side. The turning back mirror 93312 and 93313 of the first optical element assembly 961 are optically present on a downstream side with respect to the first slender mirror 93316.

In the second slender mirror 93326, the turning back mirrors 93233 and 93243 explained in the first embodiment are not used. Instead, the turning back mirrors 93233 and 93243 are communized. The second slender mirror 93326 is present further on the arrow XC side in the sub-scanning direction than the optical correction element 93321 and the turning back mirrors 93322 to 93325. The second slender mirror 93326 is long in a direction along the arrow YC side and the arrow YD side in the main scanning direction and includes a reflection surface facing the polygon mirror 92 side. The second optical element assembly 962 is optically present on the downstream side with respect to the second slender mirror 93326.

In this case, in order to set the first and second optical element assemblies 961 and 962 rotationally symmetrical with respect to the axis of symmetry S, the first slender mirror 93316 is formed as a part of the first optical element assembly 961 and the second slender mirror 93326 is formed as a part of the second optical element assembly 962. That is, if the first slender mirror 93316 and the second slender mirror 93326 are in a rotationally symmetrical relation with respect to the axis of symmetry S of the polygon mirror 92, commonization components of the first and second optical element assemblies 961 and 962 is realized.

The structure of the first optical element group for synchronization 9331 is explained below. Explanation about the structure of the second optical element group for synchronization 9332 is omitted.

The first optical element group for synchronization 9331 includes the optical correction element 93311, the turning back mirrors 93312 to 93315, and the first slender mirror 93316.

The turning back mirror 93312 makes the beams BY and BM irradiated on one end in the main scanning direction incident on the photodetectors 941 and 942.

The turning back mirror 93313 reflects the beams BY and BM irradiated on the other side in the main scanning direction toward the opposite side of the photodetectors 941 and 942 in the main scanning direction. The turning back mirror 93314 reflects the beams BY and BM reflected by the turning back mirror 93313 toward the opposite side of the polygon mirror 92 side in the sub-scanning direction crossing the main scanning direction. The turning back mirror 93315 reflects the beams BY and BM reflected by the turning back mirror 93314 toward the photodetector 941 and 942 in the main scanning direction.

The plurality of optical element groups 93 are respectively attached to the assembly bases 95. The assembly bases 95 include the first assembly base 951 and the second assembly base 952.

Figure 13:
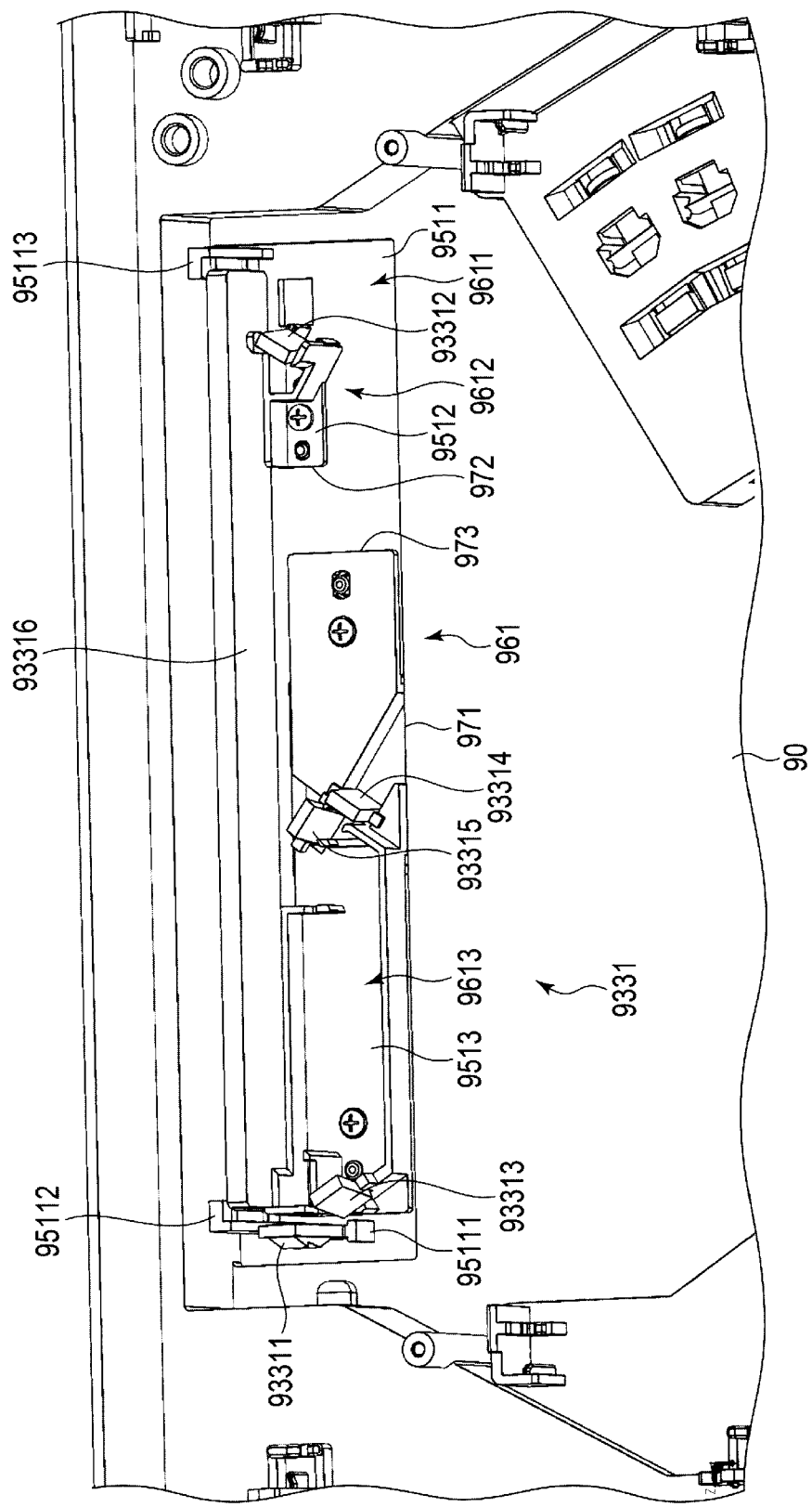
FIG. 13 is a schematic perspective view of a first optical element group for synchronization of the optical scanning device.

As illustrated in FIG. 13, the first assembly base 951 includes the first base 9511, the second base 9512, and a third base 9513.

The first base 9511 is fixed to the main body 90. The first base 9511 supports the optical correction element 93311 and the first slender mirror 93316. The first base 9511, the optical correction element 93311, and the first slender mirror 93316 are formed as the first subassembly 9611.

The first base 9511 includes a first fixing section 95111 that fixes the optical correction element 93311, a second fixing section 95112 that fixes one end in the longitudinal direction of the first slender mirror 93316, and a third fixing section 95113 that fixes the other end in the longitudinal direction of the first slender mirror 93316. The optical correction element 93311 is fixed to the first fixing section 95111 by, for example, an adhesive. The first slender mirror 93316 is fixed to the second fixing section 95112 and the third fixing unit 95113 by, for example, an adhesive.

The second base 9512 and the third base 9513 are fixed to the first base 9511. The second base 9512 supports the turning back mirror 93312. The turning back mirror 93312 is fixed to the second base 9512 by, for example, an adhesive. The second base 9512 and the turning back mirror 93312 are formed as the second subassembly 9612. The third base 9513 supports the turning back mirrors 93313 to 93315 of the first optical element group for synchronization 9331. The turning back mirrors 93313 to 93315 are fixed to the third base 9513 by, for example, an adhesive. The third base 9513 and the turning back mirrors 93313 to 93315 are formed as a third subassembly 9613.

The optical correction element 93311 on the first base 9511 is adjusted to guide the beams BY and BM to the photodetectors 941 and 942. The first slender mirror 93316 on the first base 9511 is adjusted to reflect the beams BY and BM in a predetermined direction according to a position where the beams BY and BM are irradiated. The first slender mirror 93316 makes the beam BYs irradiated on the one end in the main scanning direction serving as an image writing start position incident on the photodetector 941 via the turning back mirror 93312 and the optical correction element 93311. The first slender mirror 93316 makes the beam BYe irradiated on the other end in the main scanning direction serving as an image writing end position incident on the photodetector 941 via the turning back mirrors 93313 to 93315 and the optical correction element 93311.

The turning back mirror 93312 on the second base 9512 is adjusted to make the beams BYs and BMs reflected by the first slender mirror 93316 incident on the optical correction element 93311.

The turning back mirrors 93313 to 93315 on the third base 9513 are adjusted to reflect the beam BYe reflected by the turning back mirror 93312 in order and make the beam BYe incident on the optical correction element 93311.

Work for assembling the first optical element group for synchronization 9331 to the main body 90 of the optical scanning device 43 is explained.

In this embodiment, an operator in a subline fixes the optical correction element 93311 and the first slender mirror 93316 to the first base 9511 and manufacture the first subassembly 9611. Similarly, the operator in the subline fixes the turning back mirror 93312 to the second base 9512 and manufactures the second subassembly 9612. Similarly, the operator in the subline fixes the turning back mirrors 93313 to 93315 to the third base 9513 and manufactures the third subassembly 9613.

The operator fixes the second subassembly 9612 and the third subassembly 9613 to the first subassembly 9611. The operator adjusts a ray made incident on the first slender mirror 93316 form a predetermined angle to be made incident on the photodetectors 941 and 942 through the turning back mirror 93312 and the optical correction element 93311. The operator adjusts a ray made incident on the first slender mirror 93316 from a predetermined angle to be made incident on the photodetector 941 through the turning back mirrors 93313 to 93315 and the optical correction element 93311. In this way, the operator in the subline manufactures the first optical element assembly 961.

An operator in a mainline fixes the first optical element assembly 961 to a predetermined position of the main body 90 of the optical scanning device 43 in a predetermined direction. The operator in the mainline adjusts the first optical element assembly 961 according to necessity, makes the beams BYs and BMs (indicated by broken lines) incident on the photodetector 941 for yellow and the photodetector 942 for magenta, and makes the beam BYe (indicated by an alternate long and short dash line) incident on the photodetector 941 for yellow.

The operator in the mainline fixes the second optical element assembly 962 to a predetermined position of the main body 90 of the optical scanning device 43 in a predetermined direction. The operator in the mainline adjusts the second optical element assembly 962 according to necessity, makes the beams BCs and BKs incident on the photodetector 943 for cyan and the photodetector 944 for black, and makes the beam BKe (indicated by an alternate long and short dash line) incident on the photodetector 944 for black.

According to this embodiment, complicated mirror adjustment of the turning back mirrors 93312 to 93315 of the first optical element assembly 961 and the turning back mirrors 93322 to 93325 of the second optical element assembly 962 can be performed in the subline of the image forming apparatus 1 rather than being entirely performed in the mainline of the image forming apparatus 1. Accordingly, the operator in the mainline can reduce a time consumed for optical adjustment of the optical scanning device 43 of the image forming apparatus 1. Therefore, stagnation of a manufacturing process of the image forming apparatus 1 is suppressed from being caused by the optical adjustment in the mainline.

The first slender mirror 93316 may be fixed to at least one of the first base 9511 and the second base 9512. Accordingly, the first slender mirror 93316 may be fixed to the second base 9512 rather than the first base 9511.

The first optical element group for synchronization 9331 and the second optical element group for synchronization 9332 are rotationally symmetrical with respect to the imaginary axis of symmetry S on the polygon mirror 92. Accordingly, the second optical element group for synchronization 9332 has the same configuration as the first optical element group for synchronization 9331. Components common to the first optical element group for synchronization 9331 can be used in the second optical element group for synchronization 9332.

According to this embodiment, it is possible to provide the optical scanning device 43 that simplifies assembly in an assembly line. According to this embodiment, it is possible to provide an image forming apparatus 1 that simplifies assembly in an assembly line.

Figure 14:
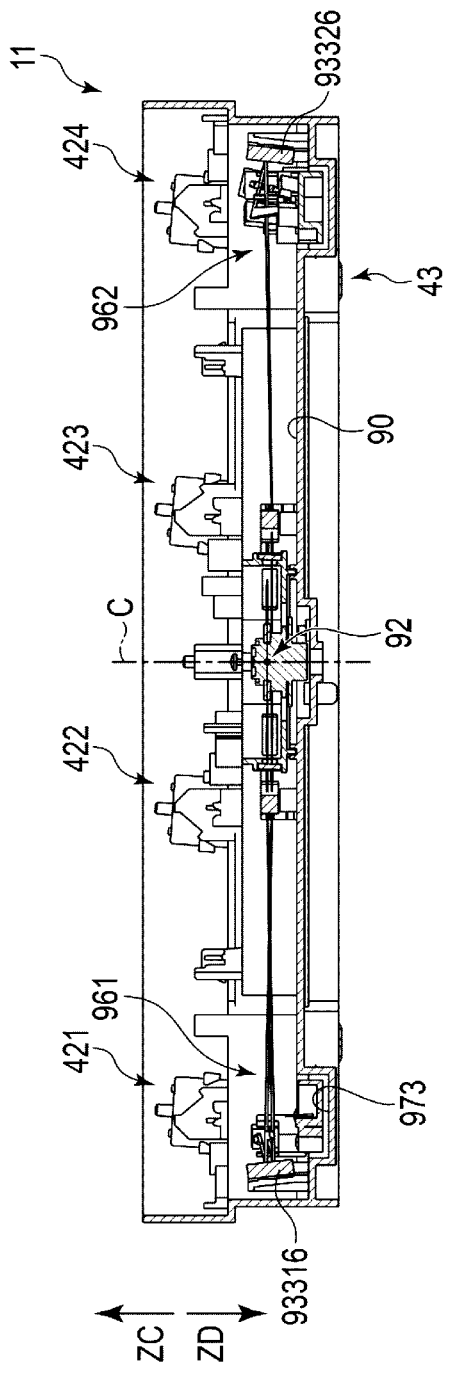
FIG. 14 is a schematic sectional view taken along a XIV-XIV line in FIG. 12 illustrating an optical scanning device according to a modification of the second embodiment.

In this embodiment, an example is explained in which the first base 9511 is separate from the main body 90. FIG. 14 illustrates a modification of the second embodiment. FIG. 14 illustrates a modification of a cross section in the same position as a cross section taken along a XIV-XIV line in FIG. 12 in the second embodiment. In FIG. 14, the first base 9511 is formed integrally with the main body 90. In this case, for example, the optical correction element 93311 and the first slender mirror 93316 are also suitably directly fixed to the main body 90 rather than the first base 9511. In this case, the second subassembly 9612 and the third subassembly 9613 are directly fixed to the main body 90. For example, the first optical element group for synchronization 9331 is optically adjusted by the operator in the mainline.

According to at least one of the embodiments, it is possible to provide the optical scanning device 43 that simplifies assembly in an assembly line. According to at least one of the embodiments, it is possible to provide the image forming apparatus 1 that simplifies assembly in an assembly line.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An optical scanning device for an image forming apparatus, the optical scanning device configured to deflect light for scanning in a main scanning direction along a rotation axis of a photoconductive body, the optical scanning device comprising:
   a plurality of light sources configured to emit laser lights;
   a plurality of photodetectors configured to detect beams formed by the laser lights;
   a plurality of optical element groups configured to guide the beams to the photodetectors; and a polygon mirror configured to deflect the beams for scanning in one direction of the main scanning direction from one end to another end on an opposite side of the one end, wherein the plurality of optical element groups cross a crossing axis parallel to the main scanning direction, cross a rotation axis of the polygon mirror, and are rotationally symmetrical with respect to an axis of symmetry parallel to the rotation axis of the polygon mirror, the optical scanning device further comprising:
    a base plate to which the plurality of light sources, the plurality of photodetectors, and the polygon mirror are attached; and
    a plurality of assembly bases to which the plurality of optical element groups are respectively attached, wherein
    the base plate includes a plurality of fixing sections configured to fix the plurality of assembly bases rotationally symmetrically with respect to the axis of symmetry, wherein a plurality of first subassemblies formed by the plurality of assembly bases and the plurality of optical element groups have a same size and a same shape, and wherein the plurality of optical element groups of the plurality of first subassemblies respectively include:

first turning back mirrors configured to reflect the beams irradiated on the other end toward an opposite side of the photodetectors in the main scanning direction;

second turning back mirrors configured to reflect the beams reflected by the first turning back mirrors toward the polygon mirror side or an opposite side of the polygon mirror side in a sub-scanning direction crossing the main scanning direction; and third turning back mirrors configured to reflect the beams reflected by the second turning back mirrors toward the photodetectors in the main scanning direction.

2. The optical scanning device according to claim 1, wherein the rotation axis of the polygon mirror and the axis of symmetry are separated.

3. The optical scanning device according to claim 1, wherein the plurality of optical element groups of a plurality of second subassemblies different from the plurality of first subassemblies respectively include fourth turning back mirrors configured to make the beams irradiated on the one end incident on the photodetectors.

4. The optical scanning device according to claim 1, wherein
    the plurality of first subassemblies formed from the plurality of assembly bases and the plurality of optical element groups are respectively components having a same size and a same shape,
    a plurality of second subassemblies formed from the plurality of assembly bases and the plurality of optical element groups are respectively components having a same size and a same shape, and
    the first subassemblies and the second subassemblies are respectively components having different shapes.

5. The optical scanning device according to claim 1, wherein the plurality of optical element groups respectively include common turning back mirrors extending along the main scanning direction and configured to reflect beams at an image writing start and beams at an image writing end.

6. The optical scanning device according to claim 1, wherein the plurality of light sources are symmetrical with respect to the crossing axis.

7. The optical scanning device according to claim 1, wherein the plurality of photodetectors are rotationally symmetrical with respect to the axis of symmetry.

8. An image forming apparatus, comprising:
    a display component;
    an operation interface;
    a paper feeding cassette;
    a paper discharge tray;
    a conveying mechanism:
    a fixing device; and
    an optical scanning device configured to deflect light for scanning in a main scanning direction along a rotation axis of a photoconductive body, comprising:
        a plurality of light sources configured to emit laser lights;
        a plurality of photodetectors configured to detect beams formed by the laser lights;
        a plurality of optical element groups configured to guide the beams to the photodetectors; and
        a polygon mirror configured to deflect the beams for scanning in one direction of the main scanning direction from one end to another end on an opposite side of the one end, wherein the plurality of optical element groups cross a crossing axis parallel to the main scanning direction, cross a rotation axis of the polygon mirror, and are rotationally symmetrical with respect to an axis of symmetry parallel to the rotation axis of the polygon mirror, the image forming apparatus further comprising:
    a base plate to which the plurality of light sources, the plurality of photodetectors, and the polygon mirror are attached; and
    a plurality of assembly bases to which the plurality of optical element groups are respectively attached, wherein
    the base plate includes a plurality of fixing sections configured to fix the plurality of assembly bases rotationally symmetrically with respect to the axis of symmetry,
    wherein a plurality of first subassemblies formed by the plurality of assembly bases and the plurality of optical element groups have a same size and a same shape, and
    wherein the plurality of optical element groups of the plurality of first subassemblies respectively include:
        first turning back mirrors configured to reflect the beams irradiated on the other end toward an opposite side of the photodetectors in the main scanning direction;
        second turning back mirrors configured to reflect the beams reflected by the first turning back mirrors toward the polygon mirror side or an opposite side of the polygon mirror side in a sub-scanning direction crossing the main scanning direction; and
        third turning back mirrors configured to reflect the beams reflected by the second turning back mirrors toward the photodetectors in the main scanning direction.

9. The image forming apparatus according to claim 8, wherein the rotation axis of the polygon mirror and the axis of symmetry are separated.

10. The image forming apparatus according to claim 8, wherein
    the plurality of first subassemblies formed from the plurality of assembly bases and the plurality of optical element groups are respectively components having a same size and a same shape, a plurality of second subassemblies formed from the plurality of assembly bases and the plurality of optical element groups are respectively components having a same size and a same shape, and the first subassemblies and the second subassemblies are respectively components having different shapes.

11. The image forming apparatus according to claim 8, wherein the plurality of optical element groups respectively include common turning back mirrors extending along the main scanning direction and configured to reflect beams at an image writing start and beams at an image writing end; and the plurality of light sources are symmetrical with respect to the crossing axis.

12. The image forming apparatus according to claim 8, wherein the plurality of photodetectors are rotationally symmetrical with respect to the axis of symmetry.

13. An optical scanning method for an image forming apparatus, comprising:

deflecting light for scanning in a main scanning direction along a rotation axis of a photoconductive body;

emitting laser lights from a plurality of light sources;

detecting beams formed by the laser lights by a plurality of photodetectors;

guiding the beams to the photodetectors using a plurality of optical element groups; and deflecting the beams for scanning in one direction of the main scanning direction from one end to another end on an opposite side of the one end using a polygon mirror, wherein the plurality of optical element groups cross a crossing axis parallel to the main scanning direction, cross a rotation axis of the polygon mirror, and are rotationally symmetrical with respect to an axis of symmetry parallel to the rotation axis of the polygon mirror, wherein, the plurality of light sources, the plurality of photodetectors, and the polygon mirror are attached to a base plate, the plurality of optical element groups are respectively attached to a plurality of assembly bases, and the base plate includes a plurality of fixing sections configured to fix the plurality of assembly bases rotationally symmetrically with respect to the axis of symmetry, and wherein a plurality of first subassemblies formed by the plurality of assembly bases and the plurality of optical element groups have a same size and a same shape, and wherein the optical scanning method further comprises:

reflecting the beams irradiated on the other end toward an opposite side of the photodetectors in the main scanning direction using first turning back mirrors;

reflecting the beams reflected by the first turning back mirrors toward the polygon mirror side or an opposite side of the polygon mirror side in a sub- scanning direction crossing the main scanning direction using second turning back mirrors; and reflecting the beams reflected by the second turning back mirrors toward the photodetectors in the main scanning direction using third turning back mirrors.

* * * * *